US012707419B2

(12) United States Patent
Hasegawa et al.

(10) Patent No.: US 12,707,419 B2
(45) Date of Patent: Aug. 11, 2026

(54) METHODS AND DEVICES FOR ASSISTED POSITIONING IN WIRELESS SYSTEMS

(71) Applicant: InterDigital Patent Holdings, Inc., Wilmington, DE (US)

(72) Inventors: Fumihiro Hasegawa, Westmount (CA); Dylan Watts, Montreal (CA); Moon Il Lee, Melville, NY (US); Jaya Rao, Montreal (CA); Tuong Hoang, Montreal (CA); Kunjan Shah, London (GB); Paul Marinier, Brossard (CA); Ghyslain Pelletier, Montreal (CA); Janet Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 119 days.

(21) Appl. No.: 18/284,792

(22) PCT Filed: Mar. 23, 2022

(86) PCT No.: PCT/US2022/021476
§ 371 (c)(1),
(2) Date: Sep. 28, 2023

(87) PCT Pub. No.: WO2022/212139
PCT Pub. Date: Oct. 6, 2022

(65) Prior Publication Data

US 2025/0081142 A1 Mar. 6, 2025

Related U.S. Application Data

(60) Provisional application No. 63/307,859, filed on Feb. 8, 2022, provisional application No. 63/274,767, filed
(Continued)

(51) Int. Cl.
*H04W 64/00* (2009.01)
*H04L 5/00* (2006.01)

(52) U.S. Cl.
CPC .......... *H04W 64/00* (2013.01); *H04L 5/0048* (2013.01)

(58) Field of Classification Search
CPC ... H04W 24/10; H04W 64/00; H04W 64/003; H04W 64/006
See application file for complete search history.

(56) References Cited

U.S. PATENT DOCUMENTS

2012/0329480 A1 12/2012 Hashimoto et al.
2013/0324154 A1 12/2013 Raghupathy et al.

FOREIGN PATENT DOCUMENTS

JP 2000011538 A 1/2000
JP 2011254367 A 12/2011
JP 2017512404 A 5/2017

OTHER PUBLICATIONS

Nokia et al., "Positioning in NTN", 3GPP Tdoc R1-1901721, 3GPP TSG-RAN WG1 #96, Athens, Greece, Feb. 25, 2019, 5 pages.
(Continued)

*Primary Examiner* — Sam Bhattacharya
(74) *Attorney, Agent, or Firm* — Volpe Koenig

(57) ABSTRACT

A wireless transmit/receive unit, WTRU, receives a plurality of positioning reference signals from a plurality of terrestrial transmission points, the positioning reference signals including at least one positioning reference signal from a first terrestrial transmission point and at least one positioning signal from a second terrestrial transmission point, on condition that at least one value based on first measurements of the plurality of positioning reference signals satisfies a condition, transmits a request to initiate, at the WTRU, positioning using positioning reference signals received from satellites, received, in response to the request, infor-
(Continued)

mation about a set of satellites, selects at least one satellite from the set of satellites, determines a second position estimate for the WTRU based on at least one positioning reference signal received from at least one selected satellite, and sends to a network node a message comprising information indicating the second position estimate for the WTRU.

20 Claims, 18 Drawing Sheets

Related U.S. Application Data on Nov. 2, 2021, provisional application No. 63/249,164, filed on Sep. 28, 2021, provisional application No. 63/227,420, filed on Jul. 30, 2021, provisional application No. 63/167,418, filed on Mar. 29, 2021.

(56) References Cited

OTHER PUBLICATIONS

Keating et al., “Overview of Positioning in 5G New Radio”, Institute of Electronics and Electrical Engineers (IEEE), 16th International Symposium on Wireless Communication Systems (ISWCS), Oulu, Finland, Aug. 27, 2019, 5 pages.

“3rd Generation Partnership Project; Technical Specification Group Radio Access Network; NG Radio Access Network (NG-RAN); Stage 2 functional specification of User Equipment (UE) positioning in NG-RAN (Release 16)”, 3GPP TS 38.305 V16.2.0, Sep. 2020, 117 pages.

Fraunhofer IIS et al., “NR-NTN: Positioning Methods”, 3GPP Tdoc R2-2008884, 3GPP TSG-RAN WG2 e-Meeting #112, Nov. 2, 2020, 11 pages.

Fraunhofer IIS et al., “Summary of [Post112-e] [115] [NTN] the Email Discussion on LCS for NTN”, 3GPP TSG RAN, WG2 e-Meeting #113-e R2-2101150, Jan. 25, 2021, 30 pages.

METHODS AND DEVICES FOR ASSISTED POSITIONING IN WIRELESS SYSTEMS

CROSS REFERENCE TO RELATED APPLICATIONS

This application is a U.S. National Stage Application under 35 U.S.C. § 371 of International Patent Application No. PCT/US2022/021476, filed Mar. 23, 2022, which claims the benefit of U.S. Provisional Application No. 63/167,418, filed Mar. 29, 2021, U.S. Provisional Application No. 63/227,420, filed Jul. 30, 2021, U.S. Provisional Application No. 63/249,164, filed Sep. 28, 2021, U.S. Provisional Application No. 63/274,767, filed Nov. 2, 2021, and U.S. Provisional Application No. 63/307,859, filed Feb. 8, 2022, which are incorporated herein by reference in their entireties.

BACKGROUND

Various conventional methods of positioning a mobile device are known. Generally these can be divided into two groups: downlink positioning methods and uplink positioning methods.

As for the downlink (DL) positioning methods, in a network, Positioning Reference Signals (PRSs) are sent from a plurality of Transmission-Reception Points (TRPs) to a User Equipment (UE), i.e. mobile device. The UE receives the multiple reference signals and measures a time difference of arrival between a pair of PRSs. Then the UE returns the measured Received Signal Time Difference (RSTD) to a Location Management Function (LMF) in the network. In addition, the UE can return measured Reference Signal Received Power (RSRP) for each PRS. Based on the returned measurements, the LMF can position the UE. In a variant, the UE measures and reports angles of arrival and RSRP for DL angle-based positioning methods.

As for the uplink (UL) positioning methods, the UE sends in the network a Sounding Reference Signal (SRS) for positioning, configured by a Radio Resource Control (RRC), to Reception Points (RPs). For timing-based methods, TRPs measure a Relative Time of Arrival (RTOA) for received a SRS and reports measured values to the LMF. The TRPs can report RSRPs for SRSs to the LMF. In angle-based uplink positioning methods, RPs measure angles of arrival and reports to LMF.

In addition, in UL and DL positioning methods, the UE can measure a reception-transmission (Rx−Tx) time difference between a received PRS and a transmitted SRS. The Rx−Tx time difference is reported to the LMF from the UE that can also report measured RSRP for PRS. Similarly, at the TRPs, the Rx−Tx difference between received SRS and transmitted PRS is computed.

SUMMARY

A wireless transmit/receive unit, WTRU, receives a plurality of positioning reference signals from a plurality of terrestrial transmission points, the positioning reference signals including at least one positioning reference signal from a first terrestrial transmission point and at least one positioning signal from a second terrestrial transmission point, on condition that at least one value based on first measurements of the plurality of positioning reference signals satisfies a condition, transmits a request to initiate, at the WTRU, positioning using positioning reference signals received from satellites, received, in response to the request, information about a set of satellites, selects at least one satellite from the set of satellites, determines a second position estimate for the WTRU based on at least one positioning reference signal received from at least one selected satellite, and sends to a network node a message comprising information indicating the second position estimate for the WTRU.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
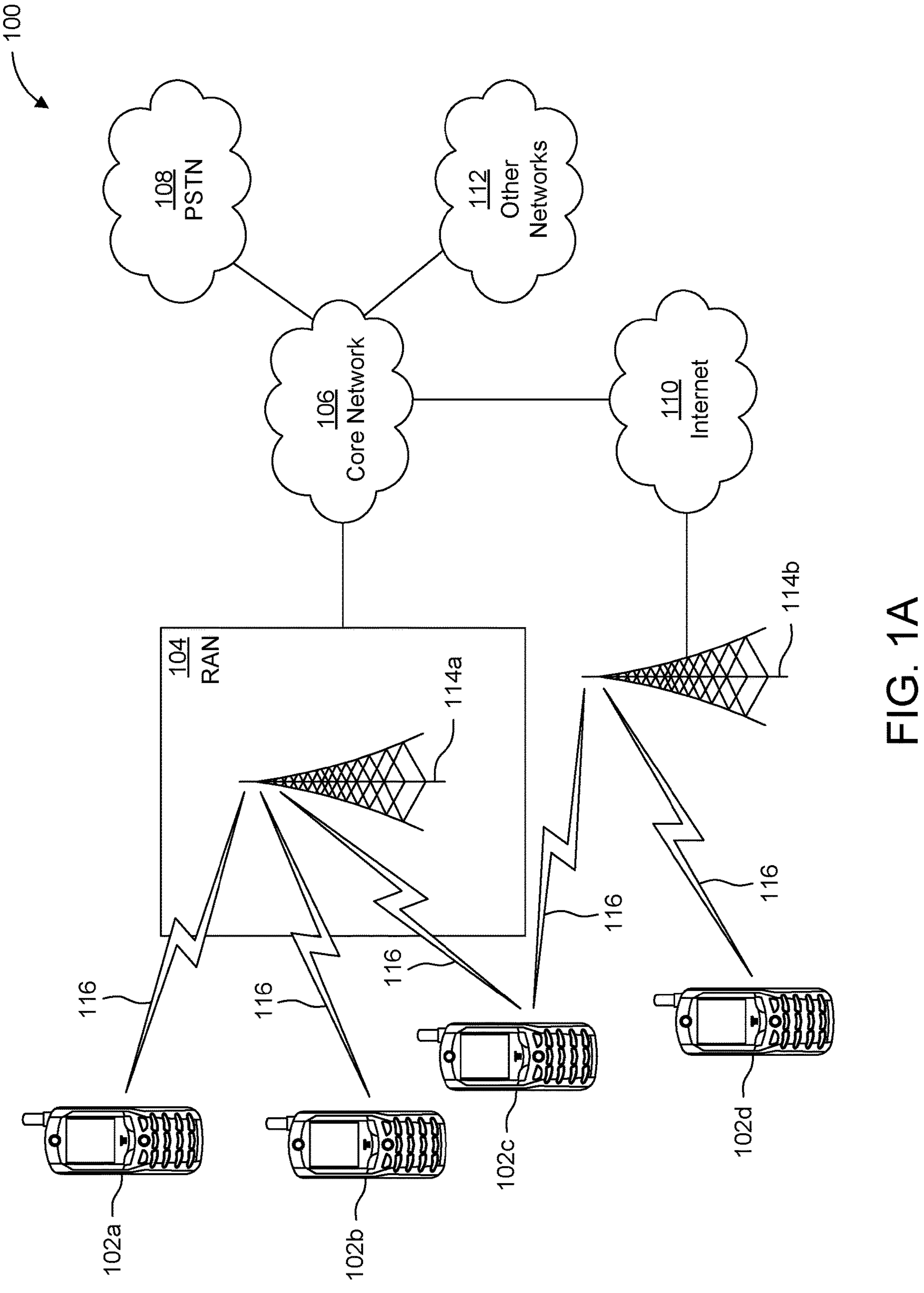
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* in the RAN 104 and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* in the RAN 104 and the WTRUs 102*a*, 102*b*, 102*c* may implement a radio technology such as NR Radio Access, which may establish the air interface 116 using New Radio (NR).

In an embodiment, the base station 114*a* in the RAN 104 and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs

102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communications networks owned and/or operated by other service providers. For example, the other networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
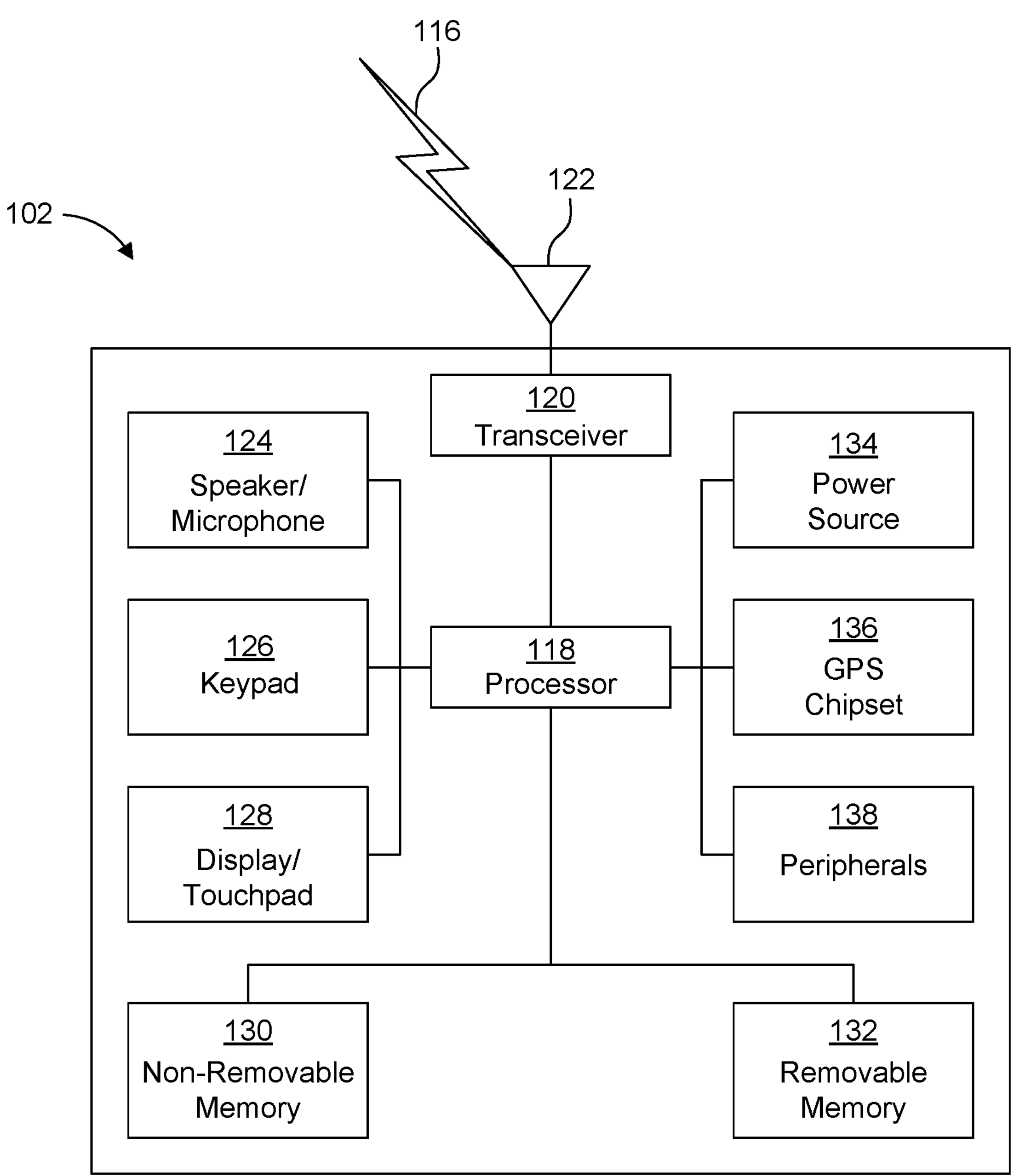
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a chipset 136 for a positioning system such as Global Positioning System (GPS), and/or other elements 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a* in FIG. 1A) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements 138, which may include one or more software and/or hardware modules that provide additional features, functionality and/or wired or wireless connectivity. For example, the elements 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The elements 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
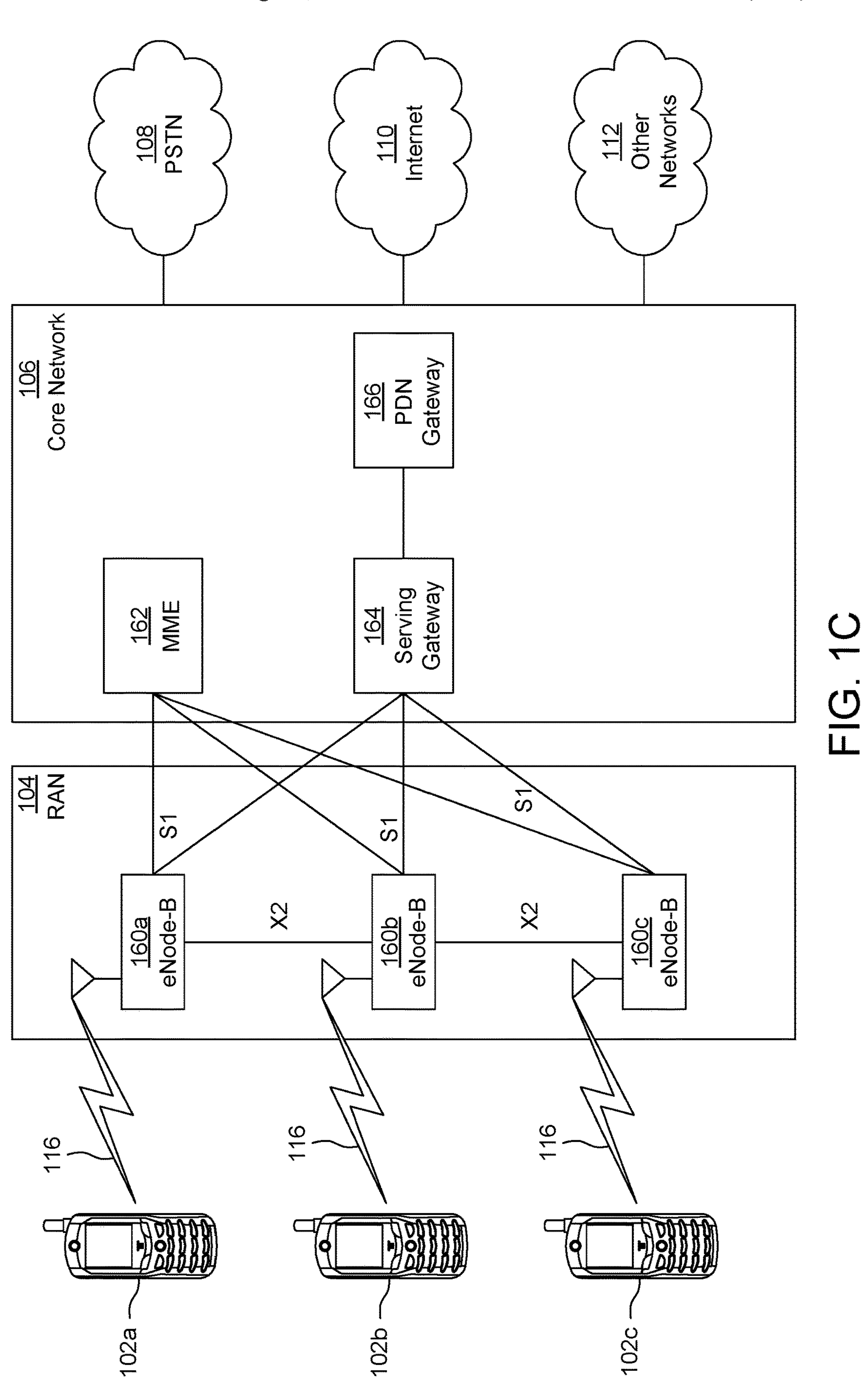
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
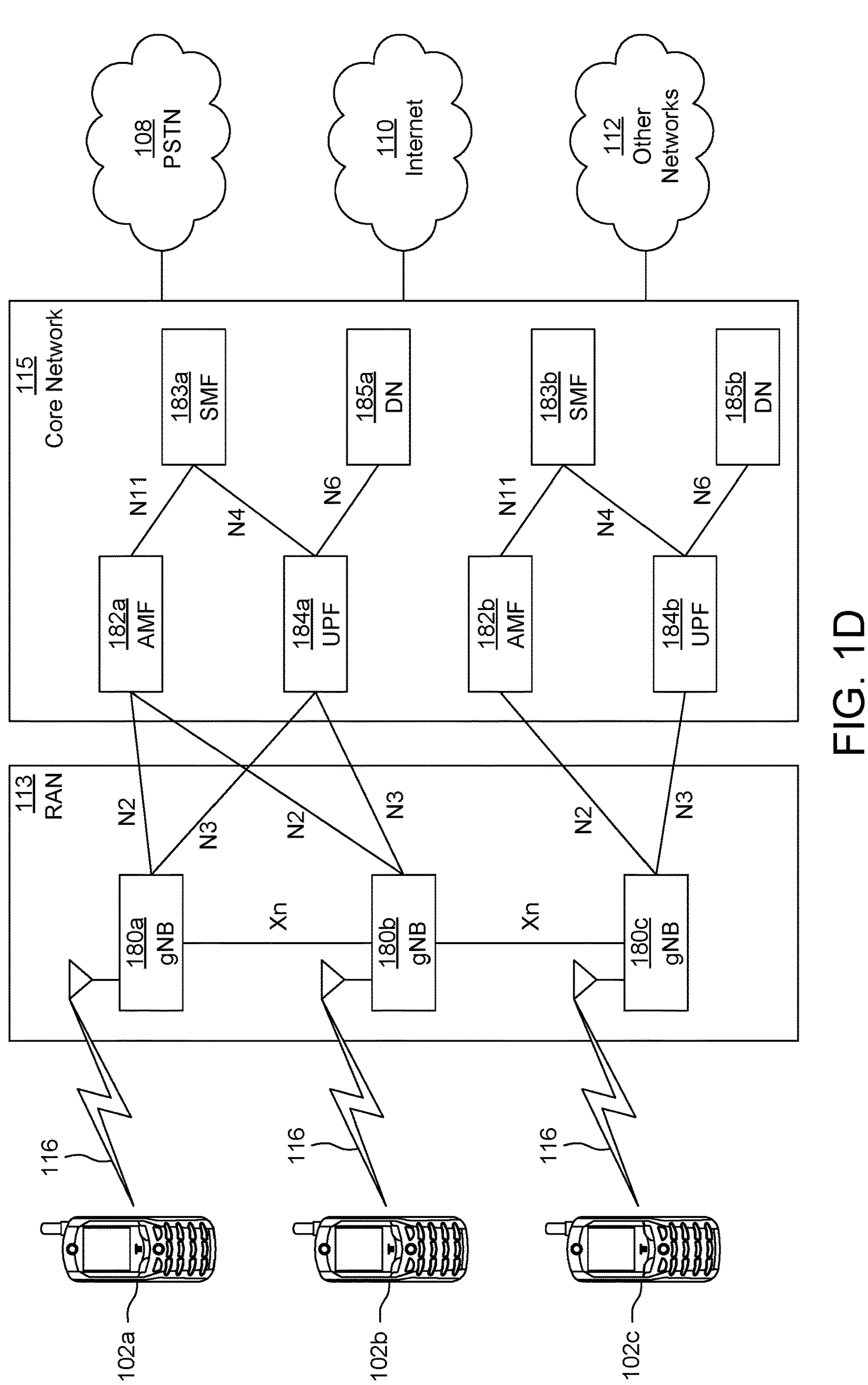
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b*, 180*c* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers (not shown) to the WTRU 102*a*. A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c in FIG. 1C). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

3GPP, "User Equipment (UE) positioning in NG-RAN," TS 38.305, ver. 16.1.0, July 2020 describes the following positioning methods, which can be used by the present principles:

A "DL positioning method" may refer to any positioning method that uses downlink reference signals such as PRS. The UE receives multiple reference signals from TPs and measures DL RSTD and/or RSRP. Examples of DL positioning methods are Downlink Angle of Departure (DL-AoD) and Downlink Time Difference of Arrival (DL-TDoA) positioning.

A "UL positioning method" may refer to any positioning method that uses uplink reference signals such as SRS for positioning. The UE transmits SRS to multiple RPs and the RPs measure the UL RTOA and/or RSRP. Examples of UL positioning methods are Uplink Time Difference of Arrival (UL-TDOA) or Uplink Angle of Arrival (UL-AoA) positioning.

A "DL & UL positioning method" may refer to any positioning method that uses both uplink and downlink reference signals for positioning. In one example, a UE transmits SRS to multiple TRPs and the base stations (gNB) measure Rx−Tx time difference. The gNB can measure RSRP for the received SRS. The UE measures Rx−Tx time difference for PRS transmitted from multiple TRPs. The UE can measure RSRP for the received PRS. The Rx-TX difference and possibly RSRP measured at UE and gNB are used to compute a round trip time. Here Rx and Tx difference refers to the difference between arrival time of the reference signal transmitted by the TRP and transmission time of the reference signal transmitted from the UE. An example of DL & UL positioning method is multi-Round Trip Time (RTT) positioning.

According to the present principles, the "network" may include AMF, LMF or Next Generation Radio Access Network (NG-RAN).

The present principles can make use of reference devices whose location are known to the network. In general, the reference device assists positioning performed by the LMF or the UE.

The LMF may be able to calibrate system parameters using the reference devices. For example, the LMF may transmit PRS to the reference device and perform a DL positioning method based on the measurements of the PRS reported by the reference device. The LMF may compare the location estimate and actual location of the reference device and perform calibration of system parameters if there is a large difference between the actual location and the location estimate of the reference device.

The expression "reference device(s)" may herein be used interchangeably with "reference point(s)", "reference UE(s)", "reference station(s)", "reference TRP(s)" and "reference gNB(s)". Further, "pre-configuration" and "configuration" may herein be used interchangeably, as may "DL-PRS," "DL PRS" and "PRS". A reference device may for example be a gNB, TRP, Access Point or UE. A reference device may satisfy a (pre)-configured QoS requirement (e.g., latency, accuracy, efficiency) for positioning or integrity for positioning. A reference device may be configured by the network (e.g., LMF, serving/neighboring gNB). The geographical location of the reference device may be broadcast by the network (e.g., LMF, serving/neighboring gNB).

A Non-Terrestrial Network (NTN) refers to a network or segment of networks using Radio Frequency (RF) resources on board a satellite or Unmanned Aircraft System (UAS) platform. Depending on the orbital altitude, satellites present challenges compared to existing terrestrial systems such as greatly increased propagation delay, and movement of network nodes.

A satellite or UAS may be classified based on orbital characteristics.

Geostationary Earth Orbit (GEO): A circular orbit at 35,786 km above the Earth's equator and following the direction of the Earth's rotation. An object in such an orbit has an orbital period equal to the Earth's rotational period and thus appears motionless, at a fixed position in the sky, to ground observers.

Non-Geostationary Satellites (Low-Earth Orbit, LEO, and Medium-Earth Orbit, MEO): orbiting around the Earth with a period that typically varies approximately between 1.5 hour and 10 hours. It is necessary to have a constellation of several Non-Geostationary satellites associated with handover mechanisms to ensure a service continuity.

High-Altitude Platform Station (HAPS): Systems including Tethered UAS (TUA), Lighter Than Air UAS (LTA), Heavier Than Air UAS (HTA), operating in altitudes typically between 8 and 50 km.

In 3GPP, "Solutions for NR to support non-terrestrial networks (NTN)", TR 38.821, v 16.0.0., December 2019, "Rel. 17", satellites or UAS relay signals or payloads from a terrestrial gNB (via a land-based gateway) to the UE. Radio links between devices in a NTN can be classified as:

a feeder link or radio link between a sat-gateway and a satellite (or UAS platform), or a service link or radio link between the UE and the satellite (or UAS platform).

A "NTN cell" or "satellite cell" is a cell that originates from a non-terrestrial platform such as a satellite or UAS. Several cells can originate from a non-terrestrial platform, where each cell may consist of one or more NTN beams. The number of cells per satellite, and number of beams within a cell may depend on the network implementation.

In current solutions, the UE measures the received PRS and either performs a positioning estimate or sends measurement reports to the LMF. It is noted that the LMF is a non-limiting example of a node or entity (e.g., network node or entity) that may be used for or to support positioning. Any other node or entity may be substituted for the LMF and still be consistent with the present principles.

Power consumption of the UE relying on Global Navigation Satellite System (GNSS) is an issue since the UE needs to measure signals from GNSS satellites constantly. Based on observed signals, the UE determines which satellites it should use for positioning. There is thus a desire for a more power-efficient positioning method.

In addition, the accuracy of positioning methods is typically adversely influenced by unknown timing or angle offsets at the transmitters/receivers or by channel conditions (e.g. multipath propagation). It can thus be desired to improve the accuracy of positioning in the presence of such unknown impairments.

In general, system information from the network is required to enable assistance-based positioning. For example, for satellite-assisted positioning, the UE requires information related to satellites from which the UE can observe reference signals. For reference-based positioning, the UE requires measurements observed by one or more reference devices for positioning methods that may use differential techniques. In addition, for UE-based positioning, the UE receives information related to reference device (s) (e.g., reference device identity (ID), location of the reference device(s), ID of PRS the reference device(s) received). Examples of the location of reference device(s) are latitude and/or longitude and/or altitude of the reference device(s) or relative location (e.g., latitude or longitude or altitude) with respect to a reference point. The location of reference device(s) may be transmitted to the UE with uncertainty information such as uncertainty semi major, uncertainty semi minor or uncertainty altitude.

In an embodiment, based on (pre-)configured conditions, the UE may determine to send a request to perform an assisted positioning method. The UE may make the first location estimate using a first positioning method with the current PRS configuration (e.g., PRS transmitted from terrestrial TRP, PSR specified in Rel. 16).

Herein, "terrestrial TRPs" and "TRPs" can be used interchangeably.

In the present principles, "TRPs" may include TRPs in the serving cell, TRPs in neighboring cells or both.

Based on the request and first location estimate reported by the UE, the UE can receive from the LMF a list of gNBs/TRPs/satellites that transmit reference signals for positioning, and/or measurements made by reference devices. After the UE receives the aforementioned information from the LMF, the UE may make the second location estimate using the assisted positioning method.

The choice of assisted positioning method can depend on the request made by the UE. The content of the assist information received from the LMF can depend on the assisted positioning method.

Using the assisted positioning method, more accurate positioning results can be obtained in the presence of unknown error sources or poor terrestrial coverage.

Satellite-Assisted Positioning

In UE-based positioning, the UE makes measurements on received PRS and determines its location. Subsequently, the UE reports its position estimate to the LMF (e.g., via LPP)

In one method, satellites may transmit reference signals for positioning. For brevity, reference signals for positioning transmitted from satellites will be referred to as satellite PRS (sPRS). Based on the sPRS, the UE may report measurements to the LMF or perform positioning at the UE (e.g., via LTE Positioning Protocol, LPP). The UE may receive PRS from terrestrial TRPs and sPRS form satellites and perform positioning using both types of reference signals.

Figure 2:
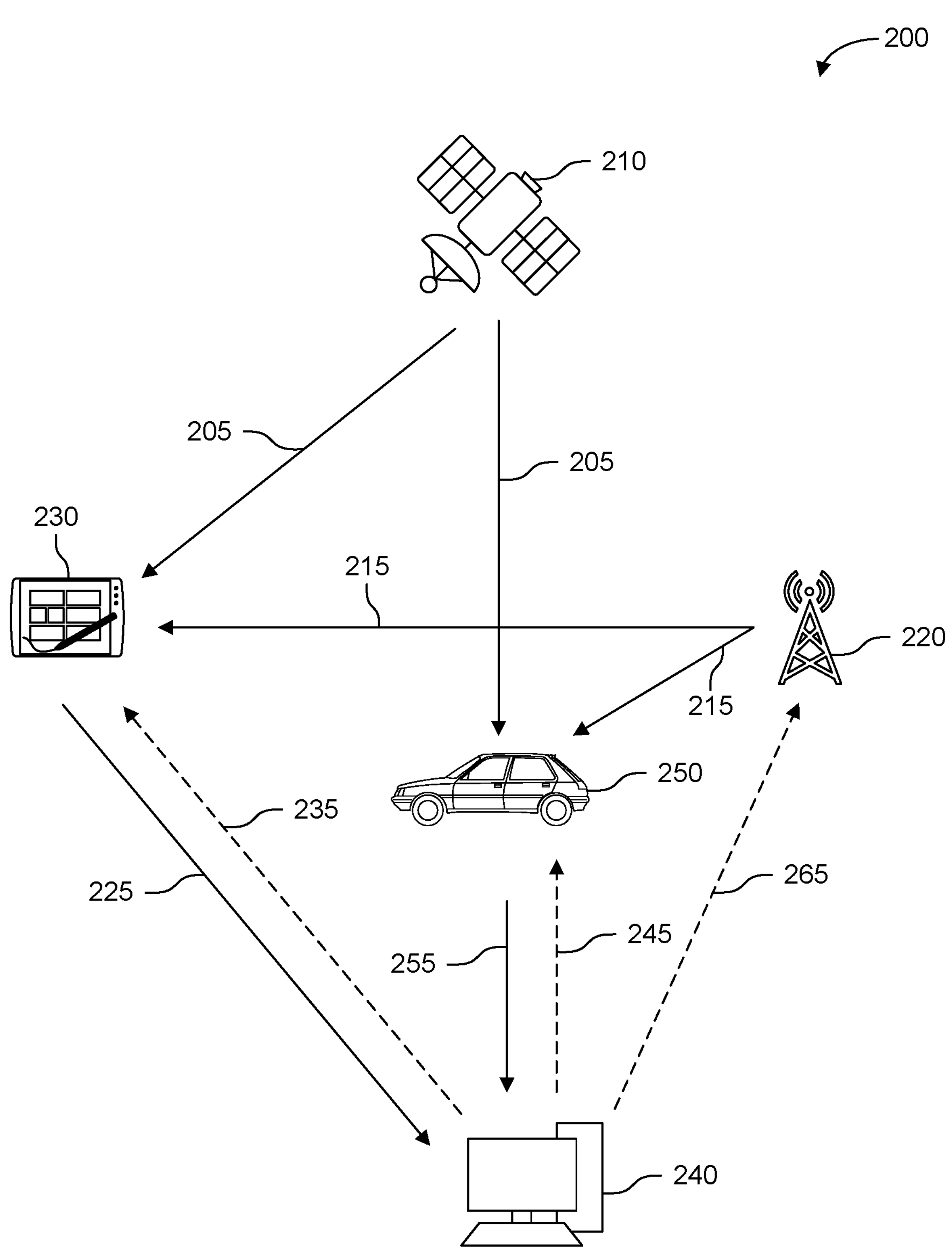
FIG. 2 is a system diagram illustrating an example of relationship between entities in a network and information exchanged among the illustrated entities.

FIG. 2 is a system diagram illustrating an example of relationship 200 between a LMF 240, a satellite 210, a TRP 220, a UE 250 and a reference device 230, as well as information exchanged among the illustrated entities.

The satellite 210 transmits a sPRS 205 to the UE 250 and the reference device 230. The TRP 220 transmits a PRS 215 to the UE 250 and the reference device 230. The reference device 230 transmits measurements 225 to and receives information for a PRS configuration 235 from the LMF 240. The UE 250 transmits a location estimate 255 to and receives information for a PRS configuration 245 from the LMF 240. The LMF transmits information for a PRS configuration 265 to the TRP 220.

It is noted that information for PRS configurations may also be transmitted from the LMF 240 to the satellite 210, if reconfiguration of PRS is possible at the satellite 210.

Initially, the UE 250 may be configured to perform positioning using PRS 215 transmitted from terrestrial TRPs 220. Herein, "terrestrial TRP" and "TRP" may be used interchangeably.

Conditions for the UE to Send a Request for Satellite-Assisted Positioning to the LMF The UE may send a request to the LMF to perform positioning assisted by satellites. The condition based on which the UE may send a request to the LMF may for example be one or more of:

- Uncertainty metrics such as variance or standard deviation of UE's location estimate made, based on PRS transmitted from terrestrial TRPs, is at or above (or below) a threshold configured by the LMF.
- Number of satellites observable from the UE, based on knowledge of satellite orbits, is at or above (or below) a threshold configured by the LMF.
- RSRP or quality of measurements observed from the configured PRS observed from terrestrial TRPs are at or above (or below) a threshold configured by the LMF.
- Variance or standard deviation of measurements from the configured PRS observed from terrestrial TRPs are at or above (or below) a threshold configured by the LMF.
- Presence of reference device(s) in the network: the UE may determine to initiate satellite-assisted positioning when it receives locations of the reference device(s) in the network by broadcast. The network may use System Information Block (SIB) for positioning or other means to broadcast locations of reference device(s) in the network.

Consistency in Location Estimate

The UE may send a request for satellite-assisted positioning, if the location estimate made by the UE (e.g., the location estimate obtained by the UE using measurements on PRS(s) transmitted from terrestrial TRPs and a UE based positioning) is not consistent over a preconfigured period of time, if the UE can observe satellites, or if the quality of terrestrial coverage is lower than the pre-configured threshold. The consistency can be measured by uncertainty quantities such as variance or standard deviation. If the uncertainty quantity exceeds the threshold configured by the LMF, for example, the UE can determine that the location estimate is not consistent and sends a request to the LMF, for example, for satellite-assisted positioning. The UE may send the request to the LMF via LPP, for example.

The UE may receive configuration data (i.e. information) related to measurement duration, e.g., from the LMF, over which the UE computes the standard deviation or variance of the location estimate.

Based on conditions configured by the LMF, the UE may determine to send an indication to the LMF that the UE will make measurements only on sPRS to make the second location estimate. The conditions may include the conditions based on which the request for satellite-assisted positioning method is sent by the UE.

Alternatively, if one or more of the following conditions is satisfied, the UE may determine to measure only sPRS and report measurements to the LMF:

- RSRP or quality of measurements observed from the configured PRS observed from terrestrial TRPs is at or above (or below) a threshold configured by the LMF.
- RSRP of sPRS is at or above (or below) than that of terrestrial PRS by a threshold configured by the LMF. For example, if RSRP of sPRS is larger than that of PSR by 3 dB, the UE uses only sPRS for positioning.

Based on the positioning reference signals transmitted by TRPs or gNBs, the UE performs the first method, obtains the location estimate, and transmits it to the LMF. The first method may be DL, UL or DL & UL positioning method. The UE's location estimate may be made using GNSS. Alternatively, the UE may transmit the cell ID of the cell the UE is located to the LMF.

Based on the first location estimate, the LMF determines a set of satellites from which the UE may receive sPRS. Alternatively, The LMF may determine the set of satellites based on measurements of sPRS made by reference devices located close to (i.e. in proximity of) the UE.

Using the satellite-assisted positioning method, the UE makes measurements on both PRS transmitted from terrestrial TRPs and sPRS. Subsequently, the UE makes the second location estimate.

The satellite-assisted positioning method may consist of a combination of positioning methods using PRS transmitted from terrestrial TRPs and triangularization method using sPRS transmitted from multiple satellites.

After receiving the set of satellites whose sPRS it should observe, the UE may make measurements on sPRS only and not make measurements for PRS from terrestrial TRPs.

UE Detection of Candidate Satellites

The UE may detect a set of candidate satellite cells by performing a NTN (non-terrestrial network) cell search. Herein, "satellite cell" and "NTN cell" may be used interchangeably. Upon detection of a NTN cell, for example, via explicit indication in system information, presences of ephemeris, or detection of a NTN specific SIB, the UE may classify the cell as a candidate for satellite-assisted positioning.

A NTN cell search may be substituted (or complimented) by satellite information which may be detected from system information, used in a current non-terrestrial connection, via pre-existing information stored in UE system memory, or pre-provision in uSIM. This information could be, for example:

- RSRP of detected/measured cells.
- A subset of orbits which the UE can access, for example, based on orbital altitude (e.g. LEO, MEO, GEO, of HAPS), and trajectory.
- Ephemeris data (e.g. satellite position, direction, and speed) related to one or more NTN cells or satellites from a previous or current non-terrestrial connection/cell detection.
- Pre-compensation information used for initial access to a non-terrestrial cell, for example, timing advance, frequency offset, or timing drift.
- NTN cell deployment information such as beam pattern (e.g., of a satellite or NTN cell), coordinates of cell/beam center, beam polarization (e.g. LHCP or RHCP), beam deployment (e.g. fixed or moving), cell frequency, or information regarding time a cell will serve an area.
- Neighbour NTN cell information, such as upcoming cell ID, time when the NTN cell will serve the area, signal strength measurements, or information to perform neighbour cell access (e.g. time/frequency pre-compensation values).

Alternatively, the LMF may provide the UE with a subset or set of satellites which are currently serving the area based on information regarding UE location. The LMF may possibly request UE to obtain one or more of the above pieces of information to be reported (e.g. via LPP) as UE assistance information, possibly to further reduce a candidate satellite subset.

In satellite communication, due to the large propagation delay the signal needs to transmit between satellite, base station and the UE, pre-compensation of time and frequency is needed. Assistance information may be dependent on UE capability. For example, if the UE indicates to the network that it does not have capability to compute pre-compensation (e.g. that the UE is a non-NTN capable UE), the UE may receive from the LMF the pre-compensation value calculated at the reference device in proximality.

As assistance information, one or more of following may be provided from LMF to the UE:

- A common Timing Advance (TA) value which may indicate the propagation delay between gNB and satellite, wherein the reference point may be the gNB. Hereafter, a reference point may be referred to as a source of PRS transmission. The reference point may be at least one of satellite, gateway, gNB, and reference UE.
- A time drift rate (e.g., of an associated satellite) which may be taken into account for a UE to determine the accuracy/reliability of the measurement.
- Ephemeris information for the associated satellite which may send or relay the PRS, wherein a UE may determine the position of the associated satellite from the Ephemeris information.

Alternatively, if the UE is capable, it can compute the pre-compensation value. Such capability information may be sent to the LMF and/or gNB prior before initiation of satellite-assisted positioning.

Selection of Satellite Subset/Set

The UE may further evaluate the validity of each detected NTN cell by subjecting each cell to one or more criteria configured by the LMF. For example, a non-terrestrial cell may be considered "valid" if one or more of the following are satisfied:

- the RSRP is above a threshold (e.g., configured by the LMF);
- the satellite belongs to a specific deployment configuration, for example a specific orbit (e.g. GEO, LEO, HAPS), beam configuration (e.g. earth fixed or earth moving), payload configuration (e.g. transparent/regenerative); and
- pre-compensation values fall within a configured range (e.g. the timing advance or frequency offset must fall within a min/max threshold).

The UE may then report all candidate NTN cells to the LMF which are considered "valid" (i.e. a cell which satisfies all configured evaluation criteria). These satellites may be identified by NTN cell ID, ephemeris data, or orbital characteristics.

Alternatively, the LMF may have configured the UE to only report one or more of the "best" NTN cells (e.g. those cells which best satisfy one or more criteria, such as having the highest RSRP or the smallest pre-compensation values).

If no candidate NTN cells satisfies the criteria configured by the LMF, the UE may, for example, report nothing, provide an indication that no cells have satisfied the criterion (e.g. via an explicit indication or null set), report NTN cells which satisfy at least one criteria (if multiple are configured), or report all detected cells regardless.

The UE may indicate to the LMF one of the following options for how the LMF chooses the set of satellites:

- the first location estimate of the UE (e.g., the location estimate obtained by the UE using measurements on PRS transmitted from terrestrial TRPs and a UE based positioning method), and
- measurements reported by the reference device(s) located in proximity of the UE The UE may determine to indicate which option the LMF should follow, based on the conditions configured by the LMF.

For example, the UE may transmit a request to the LMF to use measurements reported by the reference device(s) to select satellite(s) to be used for positioning in case one or more of the following conditions are met:

if the time left until the latency requirement to complete positioning is at or above (or less) a threshold configured by the LMF, variance or standard deviation of measurements from the configured PRS observed from terrestrial TRPs are at or above (or less) than a threshold configured by the threshold, RSRP or quality of measurements observed from the configured PRS observed from terrestrial TRPs are at or below (or above) a threshold configured by the LMF, and the availability of a list of reference stations with geographical coordinates at the UE.

For example, the preference may be indicated based on latency requirements for positioning. For example, if there is enough time left until the latency requirement, the UE may determine to indicate to the LMF to use measurements reported by the closest reference device to determine the satellites the UE should receive sPRS from. The reference devices in proximity of the UE may be determined by the LMF based on the first location estimate.

As another example, the UE may transmit a request to the LMF to use the first location estimate (e.g., the location estimate the UE calculated using measurements on PRS(s) transmitted from terrestrial PRSs) to select satellite(s) if one or more of the following conditions are met:

if the time left until the latency requirement to complete positioning is at, below (or above) a threshold configured by the LMF, RSRP or quality of measurements observed from the configured PRS observed from terrestrial TRPs is at, above (or below) the threshold configured by the LMF, and availability of a list of reference stations with geographical coordinates at the UE, e.g., if the list is not available, the UE transmits its location estimate to the LMF.

The UE may obtain the list of reference stations with geographical coordinates, which may be transferred to the gNB from the LMF, and the UE may obtain the list broadcasted by the serving gNB.

The UE may receive a set of satellites from the LMF from which the UE observes sPRS. Information related to the satellites may be one or more of:

satellite ID, pre-compensation values for time and frequency associated to the satellite ID where pre-compensation value could be between the UE and satellite and/or satellite and gNB, and sPRS configuration such as density of sPRS in the frequency domain and time domain, periodicity of transmission, associated with satellite ID, sPRS ID, sPRS resource ID, sPRS resource set ID.

Validity of Satellite Subset/Updating Satellite Subset

Considering the validity of each satellite within the subset/set may vary based on UE or satellite movement, the UE may be configured to re-evaluate periodically a current subset of satellite cells or to perform satellite cell detection procedure. This may be performed, for example, subject to a validity timer configured by the LMF.

The frequency of periodicity may be common to all satellites within the subset or evaluated individually based to characteristics of the satellite cell. For example, a satellite with different orbital characteristics such as altitude (e.g. GEO, MEO, LEO, or HAPS) or satellite configuration (e.g. earth moving beam or earth fixed beam) may be subject to different frequencies of evaluation.

Configuration of the validity periodicity may be determined by the LMF based on UE assistance information regarding NTN cell deployment characteristics. Alternatively, the LMF may provide a general configuration for each NTN deployment scenario (e.g. a different periodicity would apply to a LEO cell than a GEO cell), which would be evaluated by the UE.

Upon (re)evaluation of detected cells, the UE may trigger an event if one or more of the following occurs:

RSRP falls below a threshold (e.g., configured by the LMF);

a pre-compensation value (e.g. timing advance or frequency offset) exceeds a threshold (e.g., configured by the LMF or gNB); and an expected transmission was not detected (e.g. ephemeris data, sPRS, sPRS assistance information) or failed to decode.

Upon detection of one or more of these events the UE may, for example, immediately perform a corrective action (as listed in following section), increment a counter, or start a timer. Upon corrective action (i.e. RSRP returns above a threshold configured by the LMF, or sPRS was successfully detected/decoded) the counter or timer may be reset.

Modification or re-evaluation of the existing subset of NTN cell(s) may be classified as a "subset update event" (also referred to as an "event"). The UE may trigger a subset update event and associated set of actions upon, for example, one or more of:

a NTN cell within the subset is not longer considered valid (i.e. no longer satisfies one or more validity criteria);

an explicit request from the LMF;

modification of one or more evaluation criteria; and the counter exceeding a pre-configured value (e.g., configured by the LMF), or upon timer expiry.

Upon detection of an NTN cell subset update event, the UE may perform one or more of the following actions:

detection procedure for candidate NTN cell(s);

evaluation of current cell(s) within satellite set and any newly identified NTN cell(s);

replacement, removal, or addition to current set of candidate NTN cell(s); and reporting of detected cell(s) or cell(s) information, evaluation results, or current cell set to LMF.

The actions a UE may perform may vary depending on what triggered the event. For example, the LMF may explicitly request the UE to perform a detection procedure and report the results. In another example, if a NTN cell no longer meets the validity criteria, the UE may remove the NTN cell from the subset. The UE response to each subset update event may be configured by the LMF. In another example, the UE may use the first positioning method (e.g., without using measurements obtained from satellite PRS (sPRS)) and may then use the second positioning method that uses both sPRS and PRS, where the UE performs at least one of the following actions: (1) the UE receives sPRS from satellites in the list of satellites received from the LMF, and (2) the UE receives sPSRS from satellite(s) which provide NTN cell(s) that satisfy validity criteria (e.g., NTN cell(s) with active valid timer(s) configured by the LMF).

Figure 3A:
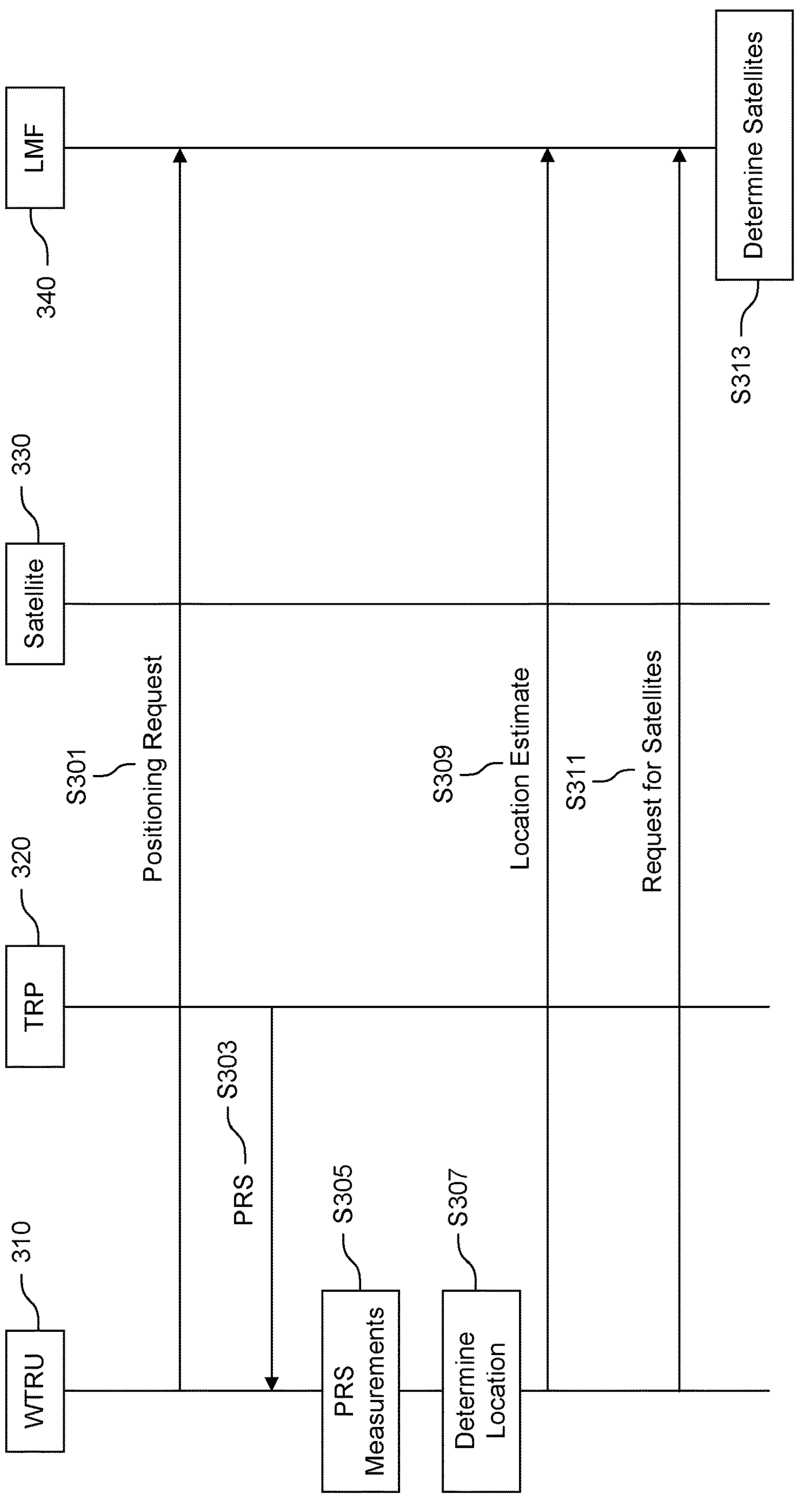
FIGS. 3A and 3B are flow charts illustrating of a method for reference-assisted UE-based positioning according to an embodiment.
Figure 3B:
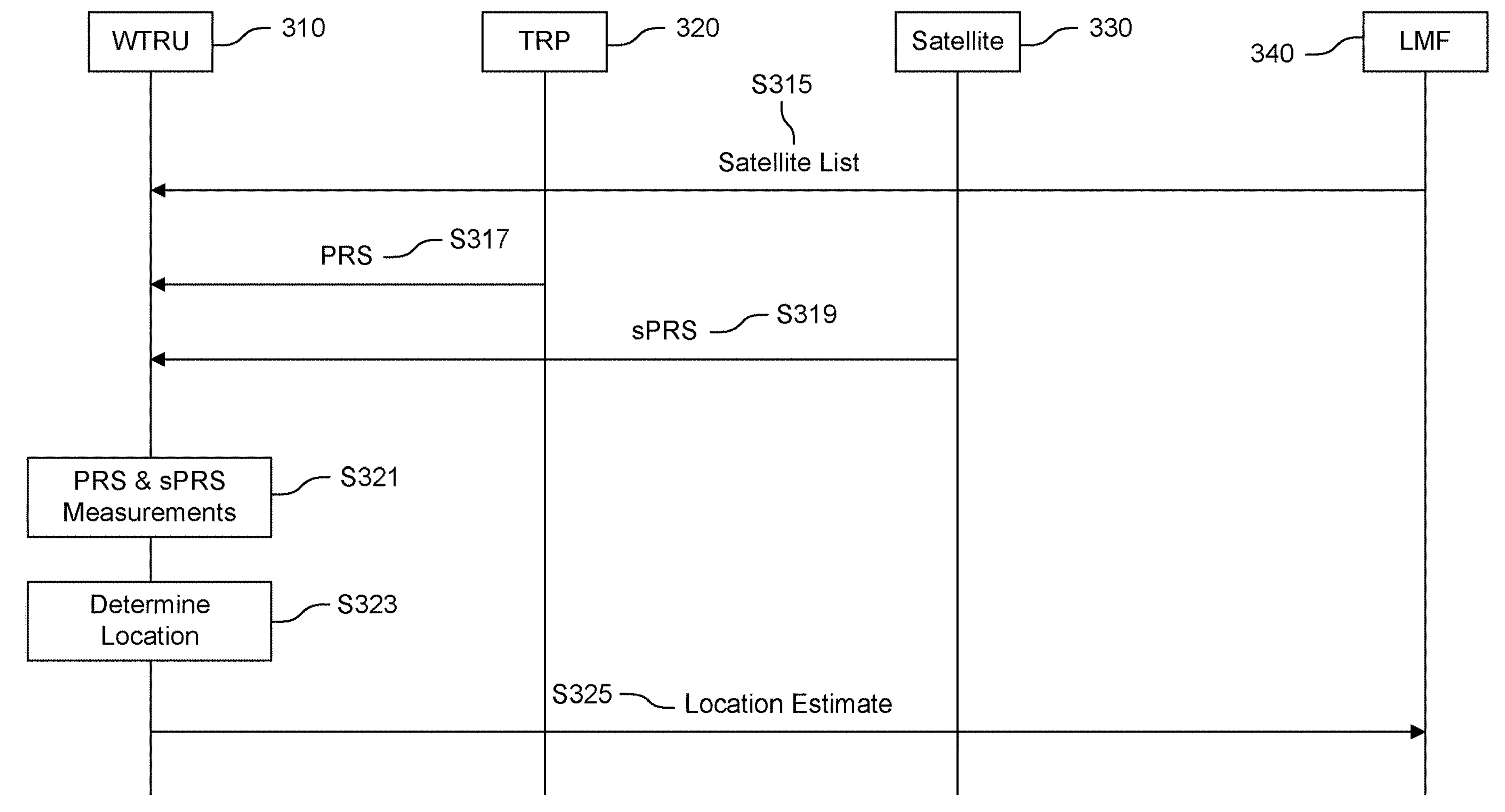

FIGS. 3A and 3B are flow charts together illustrating of a method 300 for reference-assisted UE-based positioning according to an embodiment.

In step S301, the UE 310 initiates satellite-assisted positioning by transmitting a request to the LMF 340 to initiate satellite-assisted positioning based on condition(s) configured by the LMF 340.

In step S303, the UE 310 receives PRS from the terrestrial TRP(s) 320 (e.g. RAN or gNB).

In step S305, the UE 310 performs PRS measurements.

In step S307, the UE 310 determines its location using a first method, based on measurements from terrestrial PRS.

It is noted that the first location estimate may be based on GNSS in case, for example, PRS configuration/assistance information is not available at the UE when the UE attempts to make the first location estimate.

In step S309, the UE 310 transmits the resulting location estimate to the LMF 340.

In step S311, the UE 310 transmits to the LMF 340 a request for a list of satellites.

In step S313, the LMF 340 determines a list of observable satellites or valid NTN cells by the reference device which is within predefined distance from the UE.

In step S315, the LMF 340 sends to the UE 310 a list of satellites that the UE 310 can use for satellite-assisted positioning.

In step S317, the terrestrial TRPs transmit PRS that is received by the UE 310.

In step S319, the satellites 330 transmit sPRSs that are received by the UE 310.

In step S321, the UE 310 performs PRS and sPRS measurements.

In step S323, the UE 310 determines its location estimate based on measurements of received PRS and sPRS.

In step S325, the UE 310 transmits its location estimate to the LMF 340.

UE- and Satellite-Assisted Positioning

Figure 4:
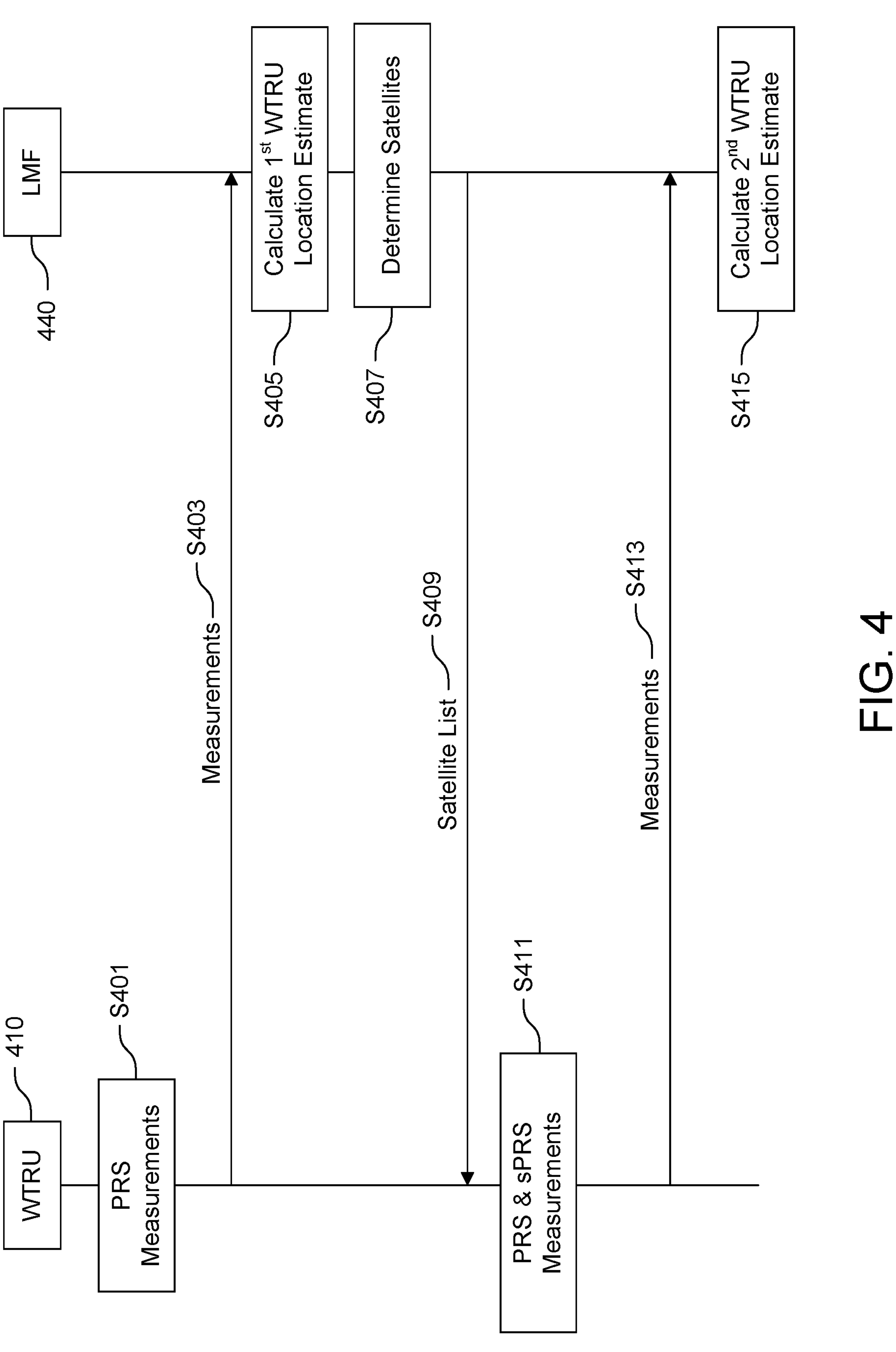
FIG. 4 is a flow chart illustrating of a method for UE- and satellite-assisted positioning according to an embodiment.

In UE-assisted positioning, the UE returns measurements to the LMF that LMF performs positioning and determines the location estimate of the UE. However, the LMF can also perform positioning assisted by both the UE and one or more satellites. FIG. 4 is a flow chart illustrating UE- and satellite-assisted positioning.

In step S401, the UE 410 performs measurements on PRS transmitted by terrestrial TRPs (not illustrated).

In step S403, the UE 410 transmits the resulting measurements to the LMF 440.

In step S405, the LMF 440 calculates the first location estimate of the UE 410 based on the measurements transmitted by the UE 410.

In step S407, based on the first location estimate, the LMF 440 determines a set of satellites 430 from which the UE 410 may receive sPRS. Alternatively, the LMF 440 may determine the set of satellites 440 based on measurements of sPRS made by reference devices (not illustrated) located in proximity of the UE 410.

In step S409, the LMF 44 sends to the UE 410 a set of satellites for which to observe transmitted sPRS.

In step S411, the UE 410 measures PRS transmitted by terrestrial TRPs and sPRS transmitted by the indicated set of satellites (not illustrated).

In step S413, the UE 410 transmits the measurements corresponding to PRS and sPRS to the LMF 440.

In step S415, the LMF 440 calculates a second location estimate of the UE 410 based on the new measurements.

Similar to the UE-based positioning, the UE may indicate to the LMF whether the LMF chooses the set of satellites based on one of the described options.

The UE may initiate UL-based positioning assisted by satellites. The UE may send a request to the LMF to receive a list of satellites to which the UE may transmit reference signals for positioning. The UE may send the request in for example the following cases:

- The UE receives statistical characteristics of the UE's location estimate from the LMF. The statistical characteristics may be variance or standard deviation of the UE's location estimate. The UE may send a request to the LMF to perform UL-based positioning using satellites if variance or standard deviation of the UE's location estimate is at, above (or below) a configured threshold by the LMF.
- The number of satellites observable from the UE based on knowledge of satellite orbits.
- The UE receives RSRP or quality of measurements observed by the LMF. If the RSPR or quality of measurements are at, below (or above) a configured threshold by the LMF, the UE sends a request to the LMF to initiate satellite-assisted positioning.

Upon receiving the request from the UE, the LMF may provide a list of satellites to which the UE can transmit uplink reference signals for positioning. The UE may be provided with a propagation delay between the UE and the satellite from the LMF or gNB. The UE may apply timing offset to a Sounding Reference Signal for positioning (SRSp) transmission where the timing offset may depend on the aforementioned propagation delay.

The UE may transmit SRSp to the terrestrial TRPs and uplink reference signals for positioning to the recommended list of TRPs. Measurements on the transmitted reference signals from the UE are made by the TRPs or satellites. Subsequently, the TRPs or satellites report measurements to the LMF. Then the LMF calculates a positioning estimate using the reported measurements and uplink based positioning methods.

UE Choosing Between Terrestrial PRS and Satellite PRS

The UE may send a request to the network (e.g., LMF, gNB) to observe PRS from satellites if for example at least one of the following conditions is satisfied:

- RSRP of PRS from terrestrial TRPs is below or equal to the preconfigured threshold; and
- Standard deviation/variance/range (e.g., maximum or minimum value of RSRP) of measurements of PRS (e.g., RSRP, AoA, AoD, time of arrival, TDOA, RSTD) is above (or below) or equal to the preconfigured threshold.

The UE may report measurements using LPP messages. If one of the above conditions is satisfied, it indicates that the conditions are not favorable for measuring PRS from terrestrial TRPs. Thus, the UE may request to initiate satellite-assisted positioning. Based on the measurements from the PRS observed from terrestrial TRPs, the UE may return the location estimate to the network. Alternatively, the UE may return measurements, uncertainty associated with measurements or location estimate (e.g., standard deviation, variance, range) made on PRS transmitted from terrestrial TRPs.

Based on the location estimate returned by the network or determined by the network based on the measurements returned from the UE, the UE may receive from the network a list of satellites from which to measure satellite PRS. The UE may also receive from the network (e.g., LMF or gNB) assistance information related to the satellites such as specific orbit (e.g. GEO, LEO, HAPS), beam configuration (e.g.

earth fixed or earth moving), payload configuration (e.g. transparent/regenerative), location of satellites, satellite ID, pre-compensation information used for initial access to a non-terrestrial cell, for example, timing advance, frequency offset, or timing drift. Based on assistance information, the UE may determine from which satellites to make measurements. For example, the UE may determine which satellites to make measurements on (i.e., determination of valid satellites), based on at least one of the following conditions:

- The satellite belongs to a specific deployment configuration, for example a specific orbit (e.g. GEO, LEO, HAPS), beam configuration (e.g. earth fixed or earth moving), payload configuration (e.g. transparent/regenerative); and
- Pre-compensation values are within a configured range (e.g. the timing advance or frequency offset is within a min/max threshold).

Upon determination of validity of satellites, the UE may send a report to the network (e.g., LMF, gNB) to indicate the satellites from which the UE will make measurements. Furthermore, upon receiving satellite PRS from the satellites determined to be valid, the UE may determine not to make further measurements on the satellite and remove the satellite from a list of valid satellites if the RSRP of satellite PRS is below a threshold (e.g., configured by the LMF). The UE may abstain from returning measurements to the LMF if RSRP of satellite PRS falls below the preconfigured threshold.

The UE may determine to use only PRS from satellite if the number of satellites determined to be valid is above the preconfigured threshold. If the number of valid satellites falls below the preconfigured threshold, the UE may determine to take at least one of the following actions:

- Use PRS transmitted from satellite and terrestrial TRPs; and
- Switch to the default positioning method (e.g., measurements based on PRS transmitted from terrestrial TRPs, GNSS/GPS based positioning, Wi-Fi-based positioning)

The UE may determine to use PRS transmitted from satellite and terrestrial TRPs, depending on the positioning method the UE uses. For example, for the timing-based method, if the number of valid satellites falls below the preconfigured threshold, the UE may determine to use only PRS transmitted from the terrestrial TRPs. Alternatively, if the angle-based method is used and the number of valid satellites falls below the preconfigured threshold, the UE may determine to use PRS transmitted from the satellite and terrestrial TRPs. The UE may include information related to the source of PRS (e.g., satellite ID, terrestrial TRP ID, or IDs associated with PRS transmitted from satellite or terrestrial TRPs) in the measurement report and send the report to the network (e.g., LMF, gNB). Once the number of valid satellites is above the preconfigured threshold, the UE may determine to use PRS from satellites only for positioning.

In the above, the pre-configuration may be configured using LPP messages sent from the LMF. Alternatively, it may be signaled by Medium Access Control (MAC), configured by RRC, or indicated in the Downlink Control Information (DCI) associated with the Physical Uplink Shared Channel (PUSCH) or the Physical Uplink Control Channel (PUCCH) for reporting measurements.

Fallback Behavior

In an example embodiment, a UE sends a request for satellite positioning if a condition is satisfied (e.g., low PRS RSRP) to the network (e.g., LMF, gNB). The UE can optionally also reports position (e.g., approximate estimate). The UE receives satellite information based on UE location (e.g., satellite ID, timing advance) from the network and returns a list of valid satellites based on validity determination (e.g., valid satellites may transmit PRS with measured RSRP above a preconfigured threshold value, or timing advance below a preconfigured threshold value). The UE returns satellite measurements (also measurements from the terrestrial TRP if RSRP from satellites that are below the threshold) to the network.

In case the RSRP of the PRS transmitted from satellites fall below a preconfigured threshold value, the UE may determine to switch to terrestrial-based positioning (e.g., the UE receives PRS from the terrestrial TRPs, makes measurement on the PRS and reports measurements to the network or estimates the location of the UE).

According to an embodiment, if at least one of the conditions in the following three paragraphs is satisfied, the UE may determine to switch to terrestrial-based positioning (e.g., receive PRS from the terrestrial TRPs and make measurements or estimate the location of the UE based only on measurements from the PRS transmitted from terrestrial TRPs).

During satellite positioning or during hybrid satellite and terrestrial positioning, the number of satellites from which the UE receives PRS with RSRP above the preconfigured first threshold value falls below the preconfigured second threshold value. For example, the first threshold value is X dBm and the number of satellites which transmit PRS with RSRP above X dBm is 2. If the second threshold value is 3, the UE determines to switch back to terrestrial-based positioning. In another example, if the UE cannot find any satellites that transmit RSRP above X dBm, the UE determines to switch back to terrestrial positioning.

The number of valid satellites (e.g., satellites that transmit PRS with RSRP above a threshold value, satellites with timing advance value below a threshold value) is below a threshold value. In this case, the UE cannot find enough satellites to perform satellite-based positioning. Thus, the UE falls back to terrestrial-based positioning.

The number of satellites received from the network (e.g., LMF, gNB) is below a preconfigured threshold value.

Once the UE has switched (switched back) to terrestrial positioning, the UE may send RSRP and/or timing measurements made on PRS transmitted from the terrestrial TRPs if the UE is configured with UE-assisted positioning by the network. If the UE is configured with UE-based positioning by the network, the UE may use RSRP and/or timing measurements made on PRS transmitted from the terrestrial TRPs to estimate the location of the UE.

Waveform and Design of sPRS

In an embodiment, the waveform used for sPRS transmitted from satellites may be Discrete Fourier Transform spread OFDM (DFTsOFDM) or OFDM symbols with transform precoding enabled; herein, DFTsOFDM, OFDM with transform precoding enabled or OFDM symbols with transform precoding enabled can be used interchangeably. The waveform may embed unique words. Different PRS patterns may be specified in the time domain. For example, different orthogonal sequences chosen from a pool of sequences based on Zadoff-Chu sequences may be used as sPRS. Selected portions (e.g., the location of the portions are configured by the LMF) of the waveform may be muted in the time domain to avoid interference with other sPRS.

The unique word embedded in the DFTsOFDM waveform may be used for identification of the satellites. For example, each unique word pattern may be associated with an index or seed number used for a random number generator to generate the unique word. The aforementioned parameter (e.g., index or seed number) may be associated with a satellite ID. The UE may receive a look-up table containing association between satellite IDs and the aforementioned parameters from the LMF or RAN (e.g., gNB). The UE may detect the unique word and determine the satellite ID from the detected unique word using the configured look-up table.

The unique word based DFTsOFDM may be generated by inserting unique words (UW) in the PRS before the Digital Fourier Transform (DFT) operation.

Figure 5:
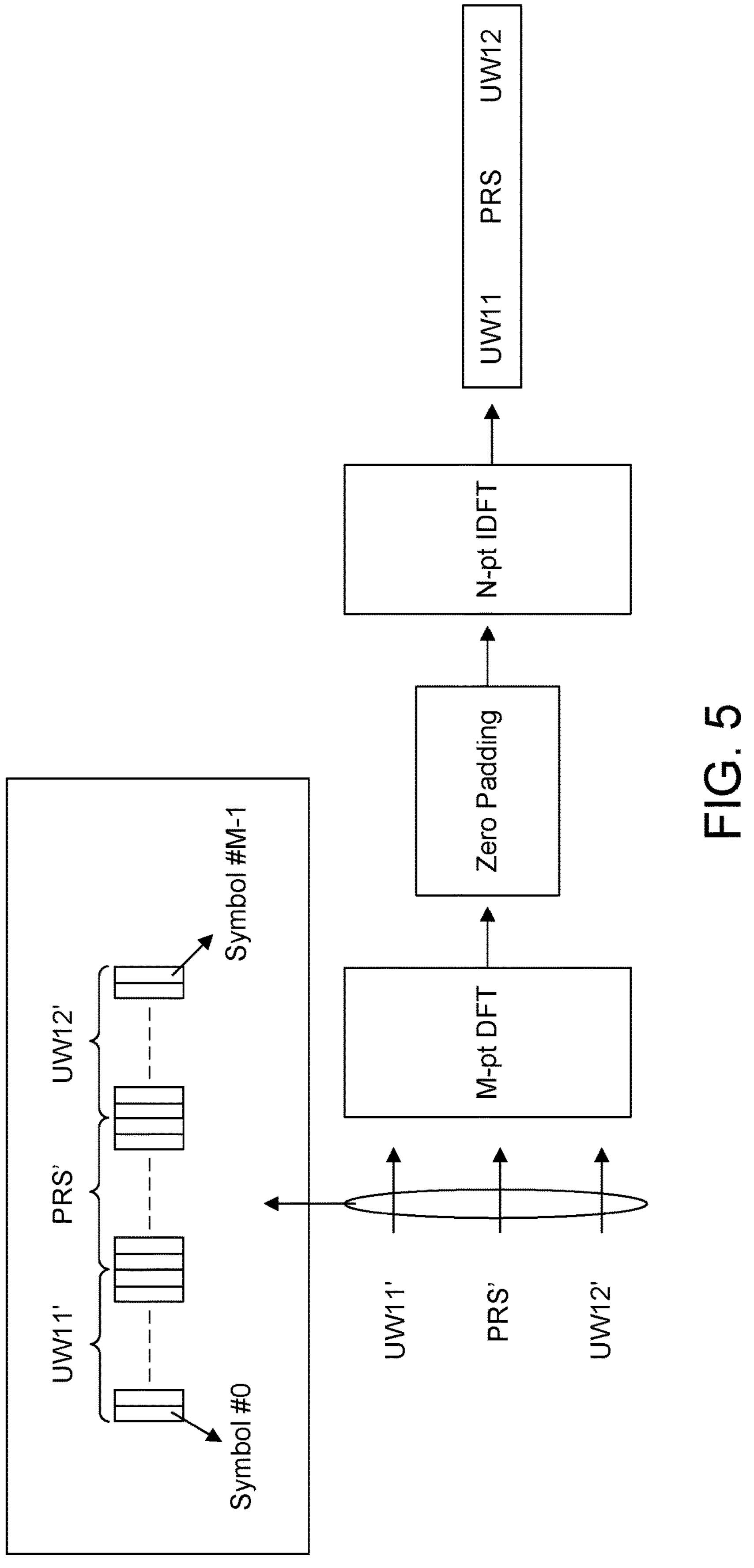
FIG. 5 illustrates an example of generation of UW DFT-sOFDM according to an embodiment.

FIG. 5 illustrates an example of generation of UW DFT-sOFDM according to an embodiment. In the example, M≤N and M and N are integers. As illustrated, UW11' and UW12', consisting of sequences of complex-valued symbols, are inserted at both ends of the input into the DFT. PRS sequences, indicated as "PRS'", are inserted in the middle of the input into the DFT. Zero padding is performed after DFT, inserting N-M zeros into the output of the DFT. A sequence of zeros can be appended to the output of the DFT or at the both ends of DFT. Finally, Inverse Discrete Fourier Transform (IDFT) is performed on the zero-padded output of the DFT, as illustrated in FIG. 5.

Reference-Assisted Positioning

In reference-assisted positioning, the network includes reference devices with location known by the LMF. The UE may require measurements observed by the reference device(s) to perform differential positioning techniques in which positioning is performed by finding a difference between measurements of the same type, e.g., a difference between RSTD measured by the UE and by a reference device. An advantage of the differential method is that it can cancel unknown time or angle offsets that exist in the measurements. In case the network includes many reference devices, requesting the network to send measurements made by all reference devices may require large bandwidth, which is why it can be desired to transmit a subset of the measurements to the UE.

The UE may send a request to the LMF to perform reference device-assisted positioning. The condition based on which the UE may send a request to the LMF may be one or more of:

- Variance or standard deviation of UE's location estimate is at, above (or below) a threshold configured by the LMF.
- The UE detects or receives from the LMF notification that one or more error sources, such as unknown timing offset, angle offset, has been detected in the network. The UE may receive from the LMF an indication which error source, based on the list of error sources configured by the LMF, may be present in the measurements the UE makes on PRS(s) transmitted by TRPs.
- Presence of reference device(s) in the network. The UE may determine to initiate the reference-assisted positioning when it receives locations of the reference device(s) in the network by broadcast. The network may use SIB for positioning or other means to broadcast locations of reference device(s) in the network.

Following the request, the UE measures PRS transmitted by TRPs and, using the first positioning method, makes a first location estimate of its position, which it sends to the LMF. The UE may include PRS related information such as PRS ID, PRS resource ID and/or PRS resource set ID associated with PRS measurements used to calculate the first location estimate. The UE may return the location estimate using positioning methods that do not require PRS such as GNSS-based positioning method.

Based on the location estimate, the LMF determines reference devices located within a configured distance from the UE. The LMF may transmit PRS to the reference devices located close to the UE, e.g., reference devices within the configured distance from the UE. Following reception of the PRS, the reference devices return measurements to the LMF that receives these measurement reports.

The UE may receive the aforementioned measurements made by the reference devices, from the LMF based on the UE's request for reference assisted positioning, so that the UE can perform positioning estimate using both measurements from the reference devices selected by the LMF and measurements made by the UE. The UE may transmit the request via LPP, indicating that the UE requests measurements made by reference devices. In the request, the UE may include one or more of:

- The ID associated with the reference device, if available.
- The number of reference devices and the amount of measurements (e.g., size expressed in bytes) the UE can process for the positioning method it uses. This information may be included in UE capability information which may be transmitted to the LMF prior to positioning.
- The number of PRS resources associated with the measurements made by a reference device.
- PRS ID, PRS resource ID and/or PRS resource set ID associated with PRS measurements the UE used to calculate the first location estimate.

The UE may receive the measurements made by the reference device(s) with the reference device's ID to identify the source of the measurements. The measurements made by the reference device may include one or more of:

- the ID associated with the reference device;
- geographical coordinates of the reference device;
- the cell ID of the cell to which the reference device belongs;
- if applicable, satellite ID and corresponding resource IDs, resource set IDs, of the sPRS on which measurements are made;
- PRS ID, PRS resource ID, PRS resource set ID of the PRS measurements on which the reference device performed the measurements;
- a time stamp indicating the time the measurements were made. The time stamp may include one or more of a PRS ID, an Absolute Radio-Frequency Channel Number (ARFCN) of the TRP associated with PRS ID, a physical cell ID, a global cell ID, a System Frame Number (SFN), and a slot number depending on Sub-space Carrier (SCS).

Some of the above information, such as geodetic location of the reference device may be broadcast by the gNB. It may be included in LPP configurations messages along with PRS configuration information.

Measurements can include one or more of:

- angle of arrival,
- time of arrival, and
- Reference Signal Time Difference (RSTD).

Figure 6:
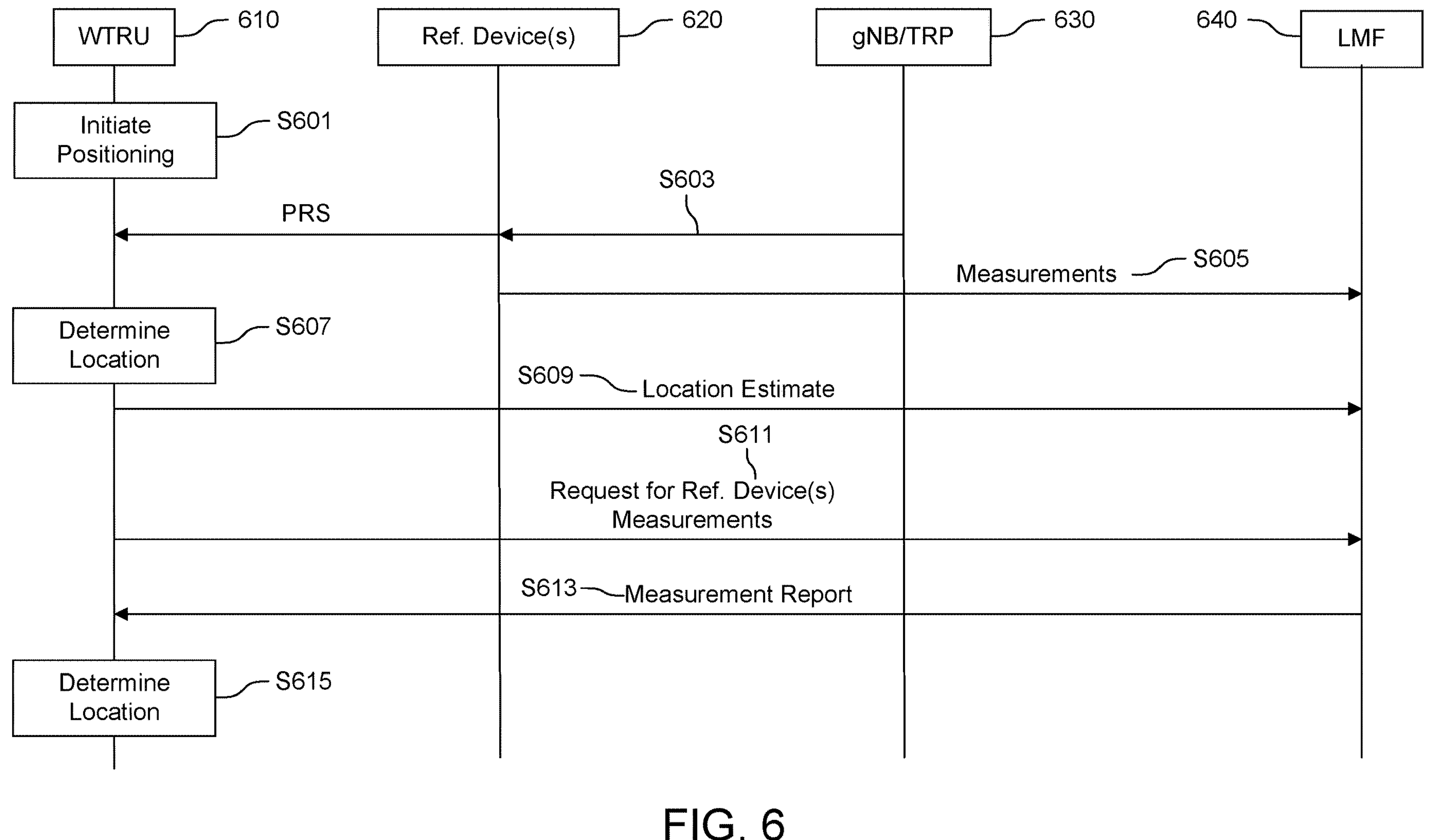
FIG. 6 is a flow chart illustrating a method for reference-assisted according to an embodiment.

FIG. 6 is a flow chart illustrating a method for reference-assisted according to an embodiment.

In step 601, triggered by at least one condition, the UE 610 initiates referenced-assisted positioning. The condition may be a fluctuating UE position over a preconfigured period of time (i.e. variance of UE position) following which a need for reference based positioning arises.

In step S603, gNBs/TRPs 630 transmit PRS to both reference device(s) 620 and the UE 610.

In step S605, the reference device(s) 620 reports measurements to the LMF 640.

In step S607, the UE 610 determines its location based on measurements from PRS.

In step S609, the UE 610 returns its position to the LMF 640.

In step S611, the UE 610 sends to the LMF 640 a request for measurements of the reference device(s) and reports the reference point-based positioning method it will use.

In step S613, the UE 610 receives measurements reports corresponding to the positioning method for the indicated number of reference points.

In step S615, the UE 610 determines it position (e.g., via LPP).

It is noted that the UE and the reference device(s) may receive PRS with different resource IDs or resource set IDs.

It will be understood that the present principles can aid the UE achieve a target positioning accuracy in the presence of unknown error sources.

Reference Assisted Positioning for Multi-RTT

In a multi-RTT positioning method, the UE receives PRS from a gNB and sends SRSp to the gNB. The UE sends the difference in PRS reception time and SRSp transmission time, i.e., Rx−Tx time difference. The LMF receives the Rx−Tx time difference from the UE and computes RTT between the UE and gNB. The LMF receives multiple values of Rx−Tx time difference between the UE and multiple gNBs and computes the location of the UE based on multiple RTTs.

Figure 7:
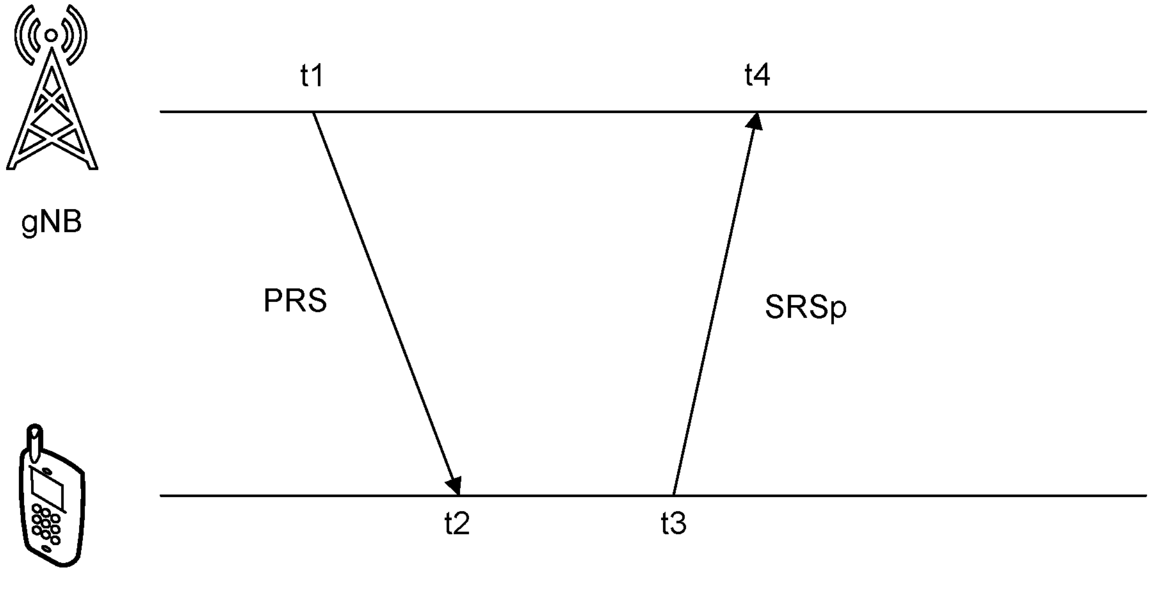
FIG. 7 illustrates a non-limitative example of exchanges between network nodes.

In UE-based multi-RTT, the UE receives Rx−Tx time at the gNB from the LMF. Based on the Rx−Tx time at the UE and gNB, the UE computes RTT and calculates the location estimate of the UE. FIG. 7 illustrates a non-limitative example of exchanges between network nodes, in particular PRS and SRSp sent between a UE and a gNB. In the example, the gNB transmits a PRS at time t1 and the UE receives the PRS at time t2. Then the UE transmits SRSp at time t3 and the gNB receives the SRSp at time t4. Units of time may be seconds, symbols or slots, for example. For a UE-assisted multi-RTT positioning method, the UE sends the LMF or gNB Rx−Tx time difference, which in the example is t3−t2. The LMF may receive the Rx−Tx time difference t4−t1 from the gNB. Thus, using the pairs of Rx−Tx time difference (e.g., t3−t2 and t4−t1), the LMF can compute a round-trip time (RTT) between the UE and the gNB. The round trip time may be used to estimate the distance between UE and gNB. In a UE-based positioning method, the UE may receive t4−t1 from the LMF or gNB and compute the round trip time itself. In a different example, the UE may transmit the SRSp first and the gNB may transmit the PRS after reception of the SRSp from the UE. In the UE-based Multi-RTT positioning method, the UE may receive multiple Rx−Tx time differences corresponding to multiple gNBs or TRPs, for example.

Figure 8:
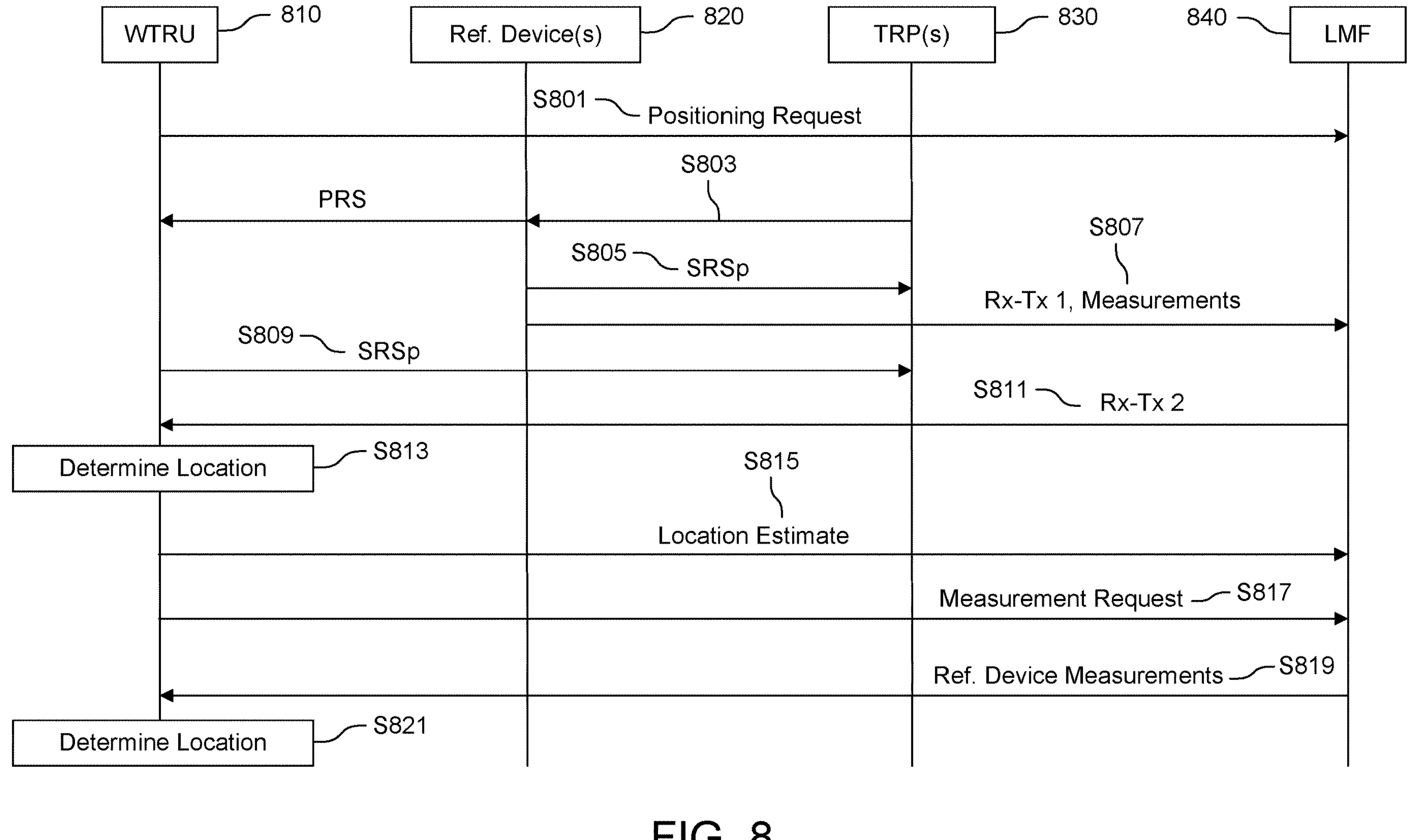
FIG. 8 is a flow chart illustrating a method of reference-assisted positioning for multi-RTT according to an embodiment.

FIG. 8 is a flow chart illustrating a method of reference-assisted positioning for multi-RTT according to an embodiment.

In step S801, the UE 810 transmits a request to the LMF 840 for referenced-assisted positioning if one or more of the following conditions are met: fluctuating UE position over preconfigured period of time (variance of UE position) and the need for reference based positioning arises, RSRPs of the PRS received from TRPs are below the threshold configured by the LMF.

In step S803, TRPs 830 transmit PRS to both reference device(s) 820 and the UE 810.

In step S805, the reference device(s) 820 transmits SRSp to the TRPs 830.

In step S807, the reference device(s) 820 sends a first associated Rx−Tx time difference (e.g., t3-t2 measured at the reference device(s) in FIG. 7) and reports measurement to the LMF 840.

In step S809, the UE 810 transmits SRSp to the TRPs 830.

In step S811, the UE 810 receives a second Rx−Tx time difference (e.g., t4−t1 in FIG. 7) from the LMF (e.g., via LPP).

In step S813, the UE 810 determines its location based on its own measurements.

In step S815, the UE 810 transmits its location estimate to the LMF 840.

In step S817, the UE 810 requests measurements of the reference device(s) and reports the reference assisted positioning method it will use (e.g., via LPP).

In step S819, the UE 810 receives from the LMF 840 measurements of the reference devices 820.

In step S821, the UE 810 determines it position based on its own measurements and those of the reference device(s) (e.g., via LPP).

The UE 810 may receive from the LMF 840 a reference device ID associated with the measurement report that may include: PRS ID(s), PRS resource ID, PRS resource set ID of the PRS the reference device(s) received to make the measurements; Rx−Tx time differences calculated at the reference device(s), e.g., t3−t2 in FIG. 7; RSRP of PRS observed by the references; SRS for positioning (SRSp) resource ID, SRSp resource set ID the reference device(s) used to compute Rx−Tx time difference.

The UE may receive the following assistance information from the gNB related to the measurements made by the reference device:

- An ID associated with the reference device,
- The cell ID of the physical cell to which the reference device belongs,
- if applicable, satellite ID and corresponding PRS IDs on which measurements are made,
- PRS ID, PRS resource ID, PRS resource set ID on which measurements are made,
- SRSp ID, SRSp resource ID, SRSp resource set ID used to compute the Rx-TX difference at the UE, and
- a time stamp indicating the time the measurements were made.

In a UE-assisted positioning method, the UE transmits measurements to the LMF and the LMF determines the location estimate of the UE.

The UE initiates referenced-assisted positioning if one or more of the following conditions is satisfied: fluctuating measurements over the configured period of time (e.g., standard deviation or variance of RSRP is above the threshold over the configured period of time), or RSRP of the measured PRS is below the threshold.

The UE and reference device(s) receive PRS from gNBs/TRPs, the reference device reports measurements to the LMF (e.g., via LPP) and the UE reports its measurements to the LMF (e.g., via LPP).

The UE may send a request to the LMF to become a reference device. In the request, the UE may send its location estimate with metrics that indicate confidence in the location estimate. The aforementioned confidence may be indicated by for example:

- standard deviation or variance associated with the location estimate, duration of time over which standard deviation or variance was computed, integrity (e.g., probability of positioning failure, tolerable limit for error in location estimate), and a confidence value (e.g., an integer value between 0 and 99, where a higher value may indicate higher confidence in the location estimate. A confidence value may be generated by software installed in the reference device).

The UE may receive an indication from the network acknowledging that the UE is a reference device (e.g., via LPP). The UE may receive a reference device ID from the network (e.g., via LPP).

UE Selected to Operate as a Reference UE/Device Based on Configured Evaluation Conditions In one family of embodiments, a UE may be selected and assigned to operate as a reference UE/device based on one or more conditions detected and reported by the UE to network (e.g. LMF and/or gNB). In one example, a UE may indicate to the network to operate as a reference UE either explicitly or implicitly based on detection of one or more evaluation conditions related to functioning as a reference UE. This example may apply for the case where the UE may autonomously determine its capability to function as reference UE. In another example, a UE may be selected by the network to operate as a reference UE based on UE capability and/or positioning information, including measurement reports/location estimates, provided by the UE to the network.

For a UE to operate as a reference UE/device, the location of the UE is to be known by the network (e.g. at LMF or RAN) with a certain positioning accuracy (e.g. with positioning error bound/standard deviation<x meters) and/or positioning integrity (e.g. with uncertainty<y % and/or confidence level>z %). The location information may be determined by the UE (in UE-based positioning) based on calculations performed by UE and/or by the network (in UE-assisted positioning) based on the measurement report provided by the UE. In both cases, the UE may be configured by network with one or more positioning methods and associated PRS/SRSp configurations. The UE may also be configured by network with other evaluation conditions/criteria for performing measurements and evaluations for determining the suitability of the UE to operate as a reference UE and that the positioning accuracy/integrity achievable is stable and maintained, possibly throughout the duration where the UE operates as reference UE. In this case, the evaluation conditions/criteria may be applied during the initial selection/assignment of a UE as a reference UE and for maintaining the function/role of reference UE, where the measurements and/or evaluations may be performed periodically or when triggered by certain events (e.g. change in UE radio conditions, mobility).

With network awareness of the location of the UE with high accuracy/integrity, the UE may be assigned to operate as a reference UE. This may involve the UE performing measurements and sending measurement reports, possibly upon receiving a request from network, such that the measurements provided by the reference UE can be correlated and used for determining the location information and/or improving accuracy of location information of other one or more UEs located in proximity with the reference UE, for example.

UE-Based/UE-Assisted Modes for Operating as Reference UE

There may be different modes (i.e. UE-based, UE-assisted modes) in which the UE may operate as a reference UE. The selection of mode for operating as a reference UE may be performed by the network (e.g. LMF) based on the capability information provided by the UE to the network. For example, in MO-LR scenario, the UE may send a capability indication to the network, including capability to operate as a reference UE upon receiving a location request and/or indication to function as a reference UE from higher layer (e.g. LCS client/application) in UE. In Mobile Terminated Location Request (MT-LR) or deferred MT-LR scenarios, the UE may send its capability information for operating as reference UE upon receiving the location request and/or reference UE indication from the LCS client/application/CN function in network. The capability information sent by the UE to network may include the different positioning methods supported, capability for performing positioning measurements and calculations with different degrees of precision, known location of UE (i.e. accuracy/integrity of location), mobility attributes (e.g. speed, direction, trajectory), etc. The capability information for operating as a reference UE may be sent in LPP message, for example. The network may determine the mode of operation and/or provide assistance information, including one or more PRS configurations and/or evaluation conditions to UE based on the capability information, for example.

In a UE-based mode, the UE may be configured with one or more evaluation conditions which may be used by the UE for making measurements and determining whether it may operate as a reference UE when satisfying the configured evaluation conditions. Upon performing the evaluations, the UE may send an indication, possibly including the measurements and evaluation results, to the network on its ability/capability to operate as a reference UE.

In a UE-assisted mode, the UE may send the measurements report comprising measurements made on a PRS configuration provided by the network. The PRS configuration may be the same configuration used for positioning or a different configuration, possibly containing extended PRS resources/beams, used for determining the UE location with higher accuracy/integrity. In UE assisted mode, the network (e.g. LMF) may evaluate and determine whether a UE may operate as a reference UE based on the measurement report sent by the UE, for example.

In both UE-based and UE-assisted modes, the context information of the UE for functioning as a reference UE, including information on the UE location, measurements and evaluation results (e.g. accuracy, integrity) may be stored, maintained and managed in network (e.g. LMF and/or gNB) and/or UE, for example. In the case when performing the evaluations in network and/or UE (e.g. due to change the conditions), the context related to the reference UE may be updated. For example, the change in radio conditions (e.g. due to PRS blockage) at the UE which may result in the inability at the UE for performing measurements on PRS with high accuracy/integrity may result in releasing the UE for operating as reference UE and update in the context information.

Upon assigning a UE as a reference UE and/or updating the context related to an existing reference UE, the information on the one or more available/active reference UEs may be indicated to other UEs. In this case, the information on reference UE, possibly including IDs, location, positioning methods supported and/or measurements made with a PRS configuration, may be indicated to other UEs in proximity. The one or more information on reference UEs may be provided by the network to other UEs in proximity in dedicated LPP messages (e.g. in assistance data, in location request), broadcast SIB and/or lower layer signaling (e.g. MAC Control Element (CE), DCI), for example.

UE Configured with Evaluation Conditions to Operate as Reference UE

In at least one embodiment, a UE may be configured with evaluation conditions for determining whether the UE can operate as a reference UE. The evaluation conditions configured may be associated with one or more positioning methods, including DL-based methods (PRS configurations for timing and/or angle), UL-based methods (SRSp configurations), DL+UL based methods (multi-RTT) and/or RAT independent methods (e.g. GNSS, WLAN). When configured with DL-based positioning, the evaluation conditions may be associated with one or more PRS configurations configured in the UE, for example. The evaluation conditions may be received by the UE in LPP message as assistance information (e.g. LPP ProvideAssistanceData) and/or in location request (e.g. LPP RequestLocationInformation), for example. In another example, the one or more evaluation conditions may be received by the UE in RRC signalling, including SIB or dedicated RRC messages, and/or in lower layer signalling (e.g. MAC CE, DCI).

The UE may perform measurements and/or evaluations associated with the configured positioning methods/PRS configurations and determine whether it may operate as a reference UE/device when one or more of the configured evaluation conditions are satisfied with respect to the measurements/evaluations. The UE may for example operate as a reference UE/device when satisfying one or more of the following evaluation conditions:

Measurements of RS:

A. For example, the UE may operate as a reference UE when one or more measurements made on the PRS and/or other RS (e.g. CSI-RS), including RSRP, RSRQ, RSSI, RSTD, etc. are above (or below) certain thresholds corresponding to the measurements. Likewise, when the SRSp transmitted by UE are received by TRPs/gNBs with RSRP values above a threshold, for example.

B. For example, when the UE is able to measure one or more beams (e.g. with beam index values) received from TRPs/gNBs with RSRP values above a threshold. Likewise, when the UL beams transmitted by the UE are received by TRPs/gNBs with RSRP values above a threshold, for example.

C. For example, the number of multipaths detected by UE with an RSRP values above a threshold is below (or above) certain multipath threshold.

D. For example, the LOS/NLOS indicator, determined based on the measurements, described herein, is above (or below) the threshold configured by the network.

Positioning Evaluations:

A. For example, when the resulting/expected accuracy determined based on the measurements and/or other parameters such as error bounds, standard deviations, etc. with respect to the PRS sources (e.g. TRPs/gNBs/satellites/other UEs) is above (or below) certain accuracy threshold.

B. For example, when the resulting/expected latency exceeds certain latency threshold for performing one of more of the following: including receiving assistance information (e.g. PRS/SRSp configurations), determining location of UE, performing measurements, sending measurement report/location estimates to network, etc.

Integrity Evaluations:

A. For example, when the resulting/expected integrity exceeds integrity thresholds (e.g. alert level, target integrity risk, time to alert) for performing one or more of the following: including positioning uncertainty (vertical and/or horizontal dimensions), protection limit (PL), latency for alert message transmission, etc.

Mobility Conditions:

A. For example, when the speed/velocity of the UE is below a certain threshold. Likewise, the UE may operate as a reference UE when the range of speed/velocity is within certain upper and lower bounds.

B. In another example, the UE may operate as reference UE when the UE follows a particular mobility trajectory, possibly consisting of one or more locations associated with different time values (e.g. timestamps), where the mobility trajectory (e.g. at the granularity of one or more cells the UE may traverse) is known/indicated to the network.

Higher Layer Indications:

A. For example, when receiving an indication from higher layers, including application, LCS client, etc., indicating to operate as a reference UE.

B. For example, the UE may operate as a reference UE when the amount of residual battery capacity is above a threshold value.

Network Indication

A. For example, a UE may operate as a reference UE when receiving a LPP message from LMF, including assistance information, location request and/or designation as reference UE. In another example, the network indication may be received in dedicated RRC signalling, SIBs, lower layer signalling (MAC CE, DCI), where the received indication may contain the ID of the UE and ID/flag for operating as reference UE.

Validity Time Duration/Periodic:

A. For example, a UE may operate as a reference UE when a configured time duration is triggered/expires, where the time duration may be tracked with a timer. In this case, the UE may operate as a reference UE, including performing functions of reference UE, so long as the configured time duration is valid and running, for example.

B. For example, the UE may perform evaluations with respect to one or more evaluation conditions periodically based on a configured periodicity value for determining whether the UE may operate as a reference UE. Upon completing the evaluations, the UE may send the status/results periodically with similar periodicity to the network, for example.

Validity Area:

A. For example, a UE may operate as a reference UE when the UE remains in the coverage areas of one or more cells (e.g. when detecting certain configured cell IDs).

The UE may not be assigned and/or may not operate as a reference UE/device when one or more of the above evaluation conditions are not met, for example. The UE may perform the evaluations for determining to operate as a reference UE over an evaluation phase, whose parameters (e.g. evaluation duration) may be received by the UE either together or separately when receiving the evaluation conditions, for example.

The UE may send to the network a status report indicating whether or not the one or more of the evaluation conditions are satisfied, possibly upon completion of the evaluation phase. Alternatively, the UE may send the status/results of the evaluations upon receiving a request indication from the network (e.g. in LPP message). The status report may be sent by the UE to the network in LPP message (e.g. LPP Provide Location Information, LPP Provide Reference UE status), RRC signalling and/or lower layer signalling (e.g. MAC CE, UCI), for example. The status report may be sent by the UE initially for requesting/indicating to become a reference UE or dynamically when detecting one or more evaluation conditions, for example. The UE may send the status report in one or more of the following reporting modes:

Periodic Reporting

A. For example, the UE may send the status report using a periodicity value which may be configured in the UE. In this case, the periodicity value may be associated with the periodicity at which the UE performs evaluations for operating as a reference UE.

B. For example, the UE may send the status report with a periodicity value which may be proportional to the ability for operating as a reference UE. In this case, the UE may increase the periodicity value from a first/default periodicity value when made measurements indicate reduction in the positioning/integrity accuracy (e.g. RSRP of PRS falls below a threshold). Likewise, the UE may increase the periodicity from a first/default periodicity value when made measurements indicate improvement in the positioning/integrity accuracy (e.g. RSRP of PRS increases above a threshold).

Semi-Persistent Reporting

A. For example, the UE may send the status report using a configured set of parameters including start time, periodicity and stop time. The UE may change the parameters (e.g. periodicity, stop time) based on the changes detected with respect to the evaluation conditions, for example.

Aperiodic Reporting

A. For example, the UE may send a single shot status report when detecting a change with respect to at least one evaluation condition.

The contents of the status report sent by UE to network related to operating as a reference UE may include one or more of the following:

Indication to Operate/not Operate as Reference UE

A. For example, the UE may indicate its ability/capability for operating as reference UE, possibly upon performing evaluations with respect to the evaluation conditions. Such indication may be sent by the UE in UE-based mode, for example.

B. For example, the UE may indicate its inability to operate as a reference UE when detecting one or more evaluation conditions indicating as such (e.g. determined accuracy<threshold). In this case, the UE may indicate additional information including the cause for not operating as a reference UE (e.g. measurements), time duration during which the UE is expected to not operate as reference UE, etc., for example.

Measurements Report:

A. For example, the UE may send the measurements made, possibly related to positioning and/or integrity, when using the information for PRS configuration(s) received from network. In this case, PRS configuration(s) may be the normal configuration used for making positioning/integrity related measurements and/or configuration specifically intended for performing measurements for determining whether the UE can operate as reference UE/device for example.

B. For example, the UE may indicate the change in the measurements with respect to previously reported measurements.

Evaluation Results

A. For example, the UE may send the results including the values determined from the measurements/evaluations with respect to the configured evaluation conditions and/or indications indicating which of the evaluations conditions (e.g. with IDs of the conditions) are satisfied/not satisfied (e.g. with flag).

Indication of Other UEs in Proximity

A. For example, the UE may send information related to other UEs in proximity, such as location information of other UEs and/or measurements made on the PRS/SRSp transmitted by other UEs.

Angle Offset

A. For example, if requested by the network, the reference UE may send angle information related to the reference UE. Angle information may contain at least one of the following: boresight angle the reference UE is facing, expected value of AoD or AoA associated with SRS or SRSp resource (e.g., associated with SRS or SRSp resource ID) transmitted from the reference UE, expected value of AoD or AoA associated with PRS resource (e.g., associated with PRS resource ID), boresight angle for SRS or SRSp resource (e.g., boresight angle of transmitted SRS or SRSp), boresight angle of antenna orientation at the reference UE, relative angle of antenna orientation with respect to a reference point at the reference UE, boresight angle of a Tx or Rx panel used to transmit SRS/SRSp or receive PRS from TRPs, respectively. The reference UE may send the aforementioned information in an LPP message, RRC, UCI or UL-MAC-CE. The UE may include the aforementioned information in the measurement reports.

B. In another example, the reference UE may receive configuration information indicating that the reference UE has not changed Tx spatial filter (e.g., direction of a transmission beam) for transmission of SRS or SRSp or Rx spatial filter (e.g., direction of a reception beam) for reception PRS resources. The reference UE may associate an indicator in the measurement report, associating the indicator with a measurement (e.g., RSRP for a PRS resource, RSTD for reference and target PRS resource). The indicator may be binary, e.g., a value "1" may indicate that the reference UE did not change the spatial filter since the last report and "0" may indicate that the spatial filter has been changed since the last report.

In response, the UE may receive from the network certain information and/or information for configurations, including one or more of the following for operating as a reference UE/device:

Identifiers: For example, the UE may receive new IDs when assigned as reference UE.

Measurement configuration: For example, the UE may be configured to perform measurements using one or more PRS configurations provided by network.

Evaluation conditions: For example, the UE may receive one or more aforementioned evaluation conditions.

Reporting configuration: For example, the UE may receive parameters, reporting type (e.g. periodic, aperiodic, semi-persistent) and/or content level (e.g. full/rich report, simplified/selected report) to apply when sending the status report.

Fallback configuration: For example, the UE may be indicated with certain fallback actions to perform when detecting one or more evaluation conditions indicating the inability to operate as a reference UE. In an example, the UE may receive from the network an indication to switch to an alternative/preconfigured PRS configuration and/or to a preconfigured positioning method (e.g. UL-based, GNSS based) when detecting certain condition (e.g. RSRP of PRS is below threshold) such that the UE may continue to operate as a reference UE for a certain duration (e.g. duration during which the condition persists).

Error group configurations: The UE may receive error group indications from the network (e.g., LMF, gNB) associated with PRS resources. Within the same error group, PRS resources may share the same error source, such as timing error or angle offset. The UE may determine to use differential positioning method if multiple PRS resources are in the same error group and the UE makes measurements on the PRS resources. The UE may receive a request to report error group configurations from the network. In this case, the UE may report Rx beam indices that share the same error source. If the UE implements UL or DL & UL positioning methods, the UE may send indicators to the network to indicate SRSp or SRS resources which share the same error source.

In another error group configuration example, if requested by the network, the reference UE may indicate UE Tx TEG (timing error group) ID or UE Rx TEG ID associated with PRS resources or SRSp resources. For example, if PRS resources are associated with the same UE Rx TEG ID, it indicates that the measurements related to PRS resources may contain the common value of timing offset. If multiple SRSp resources are associated with the UE Tx TEG ID, it indicates that the measurements made on the SRSp resources may contain the similar timing offset. The reference UE may send a request to the network to indicate TRP Tx TEG ID associated with the PRS resources transmitted from the TRP. If requested by the network (e.g., LMF, gNB), the reference UE may report UE TEG ID associated with the SRSp resources and/or UE Rx TEG ID associated with PRS resources.

In another error group configuration example, if requested by the network, the reference UE may send to the network an estimate for a timing offset value (e.g., expressed in seconds, symbols, slots, subframes, frames), angle offset value (e.g., radians, degrees) or other estimates of unknown values in the measurements associated with UE Tx TEG ID or UE Rx TEG ID. In another example, the UE may associate the timing/angle offset value with a PRS resource set ID, PRS resource ID, PRS ID, TRP ID, SRSp resource set ID, SRSp resource ID, SRS resource set ID and/or SRS resource ID. The estimate for the timing offset value may assist the network to apply correction to the measurements at the network, which may achieve more accurate positioning. If requested by other UEs (e.g., UEs which are not reference UEs), the network may broadcast correction information (e.g., timing offset obtained from the reference UE) to the other UEs. The reference UE may send UE Tx TEG ID or UE Rx TEG ID or correction information (e.g., timing offset, angle offset) to the network by UCI, UL-MAC-CE, LPP message or RRC. The reference UE may send information to the network periodically, semi-persistently or a periodically. Periodicity of the report may be configured by the network. Duration of the semi-persistent report (e.g., start/end time expressed in terms of timestamp, symbol #, slot #, subframe # or frame #) may be configured by the network. The UE may send the correction information to the network only if there are changes to correction information compared to the last occasion. The UE may receive activation or deactivation command from the network for the semi-persistent reporting via MAC-CE. The reference UE may return angle/timing offset estimation when the UE is configured with UE-based positioning. The reference UE may be configured to send a range of timing or angle offset, where the range may consist of minimum and maximum value of the estimate to indicate uncertainty in the estimate. In the report that includes the estimates, the reference UE may include its UE ID to indicate to the network the source of the estimates (or correction information).

Location information: In one example, the reference UE may be configured to perform UE-based positioning. The UE may receive a request from the network to make measurements on the configured PRS resources and process the measurements to obtain the UE location. The UE may receive a request from the network to return the UE location. In one example, the UE may return two location estimates: the first location estimate obtained by the UE using RAT independent positioning methods (e.g., GPS, GNSS, WiFi, sensor) or preconfigured location and the second location estimate may be the estimate the UE obtained by processing the measurements made on the received PRS. The first location estimate may have validity criterion associated with it. For example, the validity criterion can be at least one of the following: integrity associated with the location information (e.g., standard deviation, source of location, positioning method used to obtain the location information), time validity (e.g., timestamp associated with the location information, expiration), area validity (e.g., location information which is valid at the associated area). While the first location estimate may be known by both UE and network, the second location estimate may contain errors due to angle or timing offset present in the measurements. By returning the aforementioned location estimates, the network can derive the error between estimate and known location and estimate errors present in the measurements. In another example, the UE may return a difference between the first and second location estimate to the network. The reference UE may associate the first location estimate and second location estimate or the error between two location estimates with timing/angle offset estimate the reference UE reports to the network. The UE may include the aforementioned information in the measurement report. In another example, the UE may return uncertainty associated with the location estimate determined based on the measurements made on received PRS. Examples of uncertainty associated with the location estimate may be a range of the location estimate which includes minimum and maximum value of location estimate, standard deviation or variance in the location estimate.

In another location information example, the UE may receive the first UE location estimate from the network. The UE may compare the second UE location estimate, which is obtained by processing the measurements made on the received PRS, and report the difference between the first location and second location to the network.

In another location information example, the reference UE may receive configuration information from the network when the reference UE should report its location or timing/angle offset estimate. The reference UE may receive scheduled time (e.g., time stamp, absolute time, relative time expressed in terms of seconds, symbols, slots, subframes or frames) to report its own location or estimates.

In an example embodiment, the reference UE receives a request for positioning from the network (e.g., LMF, gNB), sends UE capability information indicating that the UE can serve as the reference, is configured to perform UE-based positioning, receives PRS configurations from the network that include a request to report an estimate for a time offset present in the measurement and scheduled time at which the UE is expected to report its location estimate, performs measurements and derives its location information, and starts a timer. In case the timer reaches the scheduled time, the reference UE reports a difference in the location information. In case the reference location is invalid (e.g., validity time expired), the UE reports the reference location (e.g., obtained from GPS), estimate for the time offset in the measurement and timestamp associated with the location.

LOS/NLOS Indication

In an embodiment, the UE may determine to include a metric that indicates likelihood of LOS (Line of Sight) or NLOS (Non Line of Sight) in a measurement report. For example the indicator may be a value from 0 to 1, inclusive, and the UE may receive a configuration information from the network (e.g., gNB, LMF) to select from values between 0 and 1. For example, the UE may select a value among 0, 0.25, 0.5, 0.75 and 1 to indicate likelihood of LOS, i.e. a LOS indicator, with 0 and 1 indicating lowest and highest likelihood of LOS, respectively. In another example, the LOS indicator of 0.5 indicates that the likelihood of LOS is uncertain. Similarly, for the NLOS indicator, 0 and 1 indicates lowest and highest likelihood of NLOS, respectively. For brevity, the LOS indicator is used in examples in this document. However, NLOS and LOS indicator may be used interchangeably.

In addition, the UE behavior described here may apply to the behavior of the aforementioned reference device or reference UE.

Dependence of Granularity of LOS Indicator on UE Capability

The UE may receive configuration information for granularities of LOS depending on UE capability. For example, some UEs may only be able to indicate 0 or 1 for the LOS indicator while other UEs may be able to return among 0, 0.25, 0.5, 0.75 or 1 for the indicator.

If the UE is not certain (e.g. cannot determine, cannot determine with required precision) about the LOS likelihood, the UE may refrain from returning the LOS indicator. For example, if the UE is configured by the network to return 0 or 1 for the LOS indicator, the UE may cancel transmission/reporting of, or refrain from returning, the LOS indicator to the network if the UE is not certain (e.g. cannot determine) whether the LOS indicator should be 0 or 1.

The UE may be preconfigured with values for LOS indicator by the network and the UE may determine which values to select from depending on the UE capability. For example, the UE may be preconfigured with 0, 0.25, 0.5, 0.75 and 1 for the LOS indicator but the UE may determine to choose to report either 0 or 1 to the network based on the UE capability.

Channel Condition Dependent Granularity

The granularity of the LOS indicator may depend on the channel condition, (e.g., Doppler shift/spread, delay spread, the number of paths in the channel). For example, the UE may determine to select the LOS indicator from 0, 0.25, 0.5, 0.75 and 1 in case the UE determines, from the PRS measurements, that the number of paths is greater than the threshold (e.g., 2 paths) configured by the network. If the number of multiple paths is less than the threshold, the UE may indicate 0 or 1 as the LOS indicator to the network.

In another example, if the UE does not measure any multiple paths in the channel i.e., if the channel is a single-path, the UE may determine not to report the LOS indicator to the network. Even the network requests the UE to return LOS/NLOS indicator(s), the UE may determine that the measurements indicating a single-path channel, i.e., RSRP and/or timing information related to the path, is sufficient to indicate that the channel characteristics.

What the Indicator is Related to

The UE may be requested by the network (e.g., LMF or gNB) to send the LOS indicator. The UE may be requested by the network to include the LOS indicator regarding at least one or a combination of the following:

- a TRP (e.g., the LMF may indicate a TRP ID) or PRS ID,
- a PRS resource (e.g., the LMF may indicate a PRS resource ID),
- a PRS resource set (e.g., the LMF may indicate a PRS resource set ID),
- PRS resources or PRS resource sets under a specific TRP (e.g., the UE may receive TRP ID and the UE reports LOS indicators for PRS resources transmitted from the TRP with the TRP ID),
- PRS resources under a specific PRS resource set (e.g., the UE may receive PRS resource set ID and the UE reports LOS indicators for PRS resources under the resource set with the resource set ID),
- a cell (e.g., the LMF may indicate a cell ID), and
- a frequency layer, (e.g., the LMF may indicate a frequency layer ID or any parameter that may be uniquely associated with the frequency layer such as Absolute Radio Frequency Channel Number).

For example, if the UE is requested to indicate the LOS likelihood for a specific TRP, the network may want to know whether the UE and TRP is in LOS. Similarly, if the UE is requested to indicate the LOS likelihood for a specific PRS resource (e.g., PRS beam), the network may want to know whether the PRS beam is directed at the UE in LOS.

The UE may indicate an association between the LOS indicator and above element(s) in the measurement report (e.g., the included LOS indicator is associated with PRS resource #2, in case the UE is requested to indicate the LOS status for PRS resource #2).

In another example, the UE may receive a request to return LOS/NLOS indicators for all PRS resources and/or TRPs that are configured for the UE. Thus, in this case, to reduce overhead required in the request, the UE may receive no specific targets (e.g., specific PRS resource IDs, TRP IDs) from the network for which the UE needs to associate the LOS indicator with. In this case, the UE may report LOS indicators for all PRS resources and/or TRPs configured for the UE.

Alternatively, the UE may receive a request to return LOS indicators for all TRPs, all PRS resources, all PRS resource sets, or all frequency layers configured for the UE.

Generation of the LOS Indicator

The UE may include the LOS indicator on condition that the LOS indicator is above, below or equal to a threshold configured by the LMF or gNB. For example, the UE may be preconfigured by the LMF or gNB to indicate 0 or 1 for the LOS indicator. If the UE is configured with two thresholds, e.g., 0.2 and 0.8, the UE may determine that if the UE obtains the LOS indicator 0.9 by processing measurements obtained from PRS, the UE may send the LOS indicator “1” to the network. If the UE obtains the LOS indicator 0.2 by processing measurements obtained from PRS, the UE may send the LOS indicator “0” to the network. If the UE obtains a LOS indicator of 0.5 by processing measurements obtained from PRS, the UE determine cancel reporting/transmission of, or not to return, the LOS indicator since the UE declares uncertainty, e.g., the UE is not certain about the likelihood of the path being LOS or NLOS.

In another example, the UE may receive a threshold from the network (e.g., LMF or gNB). For example, the threshold the UE receives may be 0.8. If the UE obtains a LOS likelihood of less than 0.8, the UE may determine to return the LOS indicator “0” to the network. If the LOS likelihood is greater or equal to 0.8, the UE may determine to return the LOS indicator “1” to the network.

The UE may determine the LOS indicator based on measurements made from PRS (e.g., RSRP, ToA, RSTD, number of paths in the channel, delay spread of the channel, Rician/K factor, RSRP per path if multiple paths are observed in the channel).

Inclusion of the Indicator in a Measurement Report

The UE may determine to include the LOS indicator in a measurement report. In case the UE is requested to measure RSRP for a PRS resource and the UE is requested to include the LOS indicator for the PRS resource, the UE may include the indicator in the report and indicate that the LOS indicator is associated with the PRS resource.

The UE may associate the LOS indicator with measurements obtained from the PRS resource. For example, the UE may associate the LOS indicator for RSRP measurement of the PRS resource.

The UE may determine to include the LOS indicator in the measurement report that contains measurements (e.g., RSRP, RSTD) or in a separate report, based on measurement configuration information received form the network. The UE may determine to report the LOS indicators in the same or separate report from the measurements based on the size of the report. For example, if the size of the report with measurements is larger than the threshold configured by the network, the UE may determine to include the LOS indicator in a separate report.

In another example, the UE may be configured by the network to associate LOS indicators with both PRS resources and TRP. For example, if the UE is configured with N PRS resources transmitted from TRP_A, the UE may determine to associate LOS indicators for N PRS resources (or measurements associated with them) and LOS indicator for TRP_A. By association of the LOS indicators for both TRP and PRS resources transmitted from the TRP, the UE may be able to assist the network to clarify how the UE determined the LOS indicator for the TRP based on LOS indicators associated with the PRS transmitted from the TRP. The UE may be configured to associate the LOS indicators with TRP and/or PRS resources based on configured granularity. For example, the UE may determine associate the LOS indicator(s) of 0 or 1 with TRP(s) and/or PRS resource(s) if the UE is configured to associate the LOS indicator of 0 or 1 with TRP(s) and/or PRS resource(s). In another example, the UE may determine to associate the LOS indicator between 0 and 1 with granularity of 0.1 with TRP(s) and/or PRS resource(s) if the UE is configured to associate the LOS indicator between 0 and 1 with granularity of 0.1 with TRP(s) and/or PRS resource(s).

UE Reporting Behavior

It may happen that the UE does not have enough measurements to return the indicator to the LOS network. The UE may receive from the network one or more of the following configurations for reporting the LOS indicator:

- an offset T (e.g., symbols/slots/frames/seconds) indicates that the UE should return the LOS indicator T 'units' (e.g., symbols/slots/frames/seconds) after the UE receives the request to return the LOS indicator from the network; the UE may need the offset to accumulate measurements to determine the LOS indicator,
- a periodicity of reporting the LOS indicator, e.g., the UE may send the LOS indicator at configured periodicity from the network, and
- duration of reporting, e.g., the UE may receive configuration information from the network about when to start/stop reporting the LOS indicator.

Once the UE receives a request from the network to report the LOS indicator, the UE may request the network specific values for the above parameters. For example, the UE may request a specific value for the offset T so that the UE can accumulate enough results to determine the LOS indicator. In addition, when the UE reports the LOS indicator, the UE may include a timestamp in the report to indicate when the UE determined the value of the LOS indicator.

In case the UE is requested to return the LOS indicator(s) for one or more PRS resource(s)/PRS resource set(s)/TRP(s)/cell(s), the UE may determine to report the LOS indicators and associated PRS resource(s)/PRS resource set(s)/TRP(s)/cell(s), with the highest value (e.g., the LOS indicator with "1") to the network.

The UE may determine not to report the LOS indicator to the network when the UE observes only one path in the PRS measurement even the UE is requested to report the LOS indicator.

The UE may determine to associate the LOS indicator with TRP and/or measurements for a PRS resource depending on preconfigured granularities for the LOS indicator. The UE may determine to make the association if the UE receives a request from the network to make the association. For example, if the UE is configured by the network to return 0 or 1 for the LOS indicator, the UE may determine to associate the LOS indicator with a TRP. In another example, If the UE is configured by the network to return a LOS indicator between 0 and 1 with a granularity of 0.1, the UE may determine to associate the LOS indicator with a PRS resource ID or measurement(s) (e.g., RSRP) corresponding to a PRS resource ID. Conversely, if the UE is configured by the network to return 0 or 1 for the LOS indicator, the UE may determine to associate the LOS indicator with a PRS resource ID or measurement(s) (e.g., RSRP) corresponding to a PRS resource ID. By specifying the relationship between granularity of the LOS indicator and a target (e.g., measurements related to a PRS resource or TRP) the LOS indicator is associated with, overhead for signaling can be reduced. The UE may associate the LOS indicator with PRS ID which may be an ID used for a TRP. An exemplary embodiment is described below:

- the UE receives configuration information from the network (e.g., gNB, LMF) related to granularity of a LOS indicator (e.g., 0/1, or [0, 1] with 0.1 granularity);
- optionally, the UE receives configuration information from the network about which TRPs or PRS resource(s) with which the UE should associate the LOS indicator(s);
- the UE associates LOS indicator(s) with TRP(s) or PRS resource(s) based on the configured granularity of the LOS indicator(s) (e.g., if the UE is configured to return 0 or 1 for an LOS indicator, the UE associates LOS indicator(s) with TRP(s));
- the UE determines the LOS indicator for TRP(s) or PRS resource(s) based on measurements obtained from PRS resource(s); and
- the UE reports the LOS indicator(s) to the network in a measurement report.

Validity Condition for the LOS Indicator

The UE may receive configuration information for validity for the LOS indicator. The UE may be configured with a timer by the network which indicates duration of validity for the LOS indicator. The UE may start a timer when the UE reports the LOS indicator. Once the timer reaches the configured time limit, the UE may determine to send a LOS indicator to the network.

The UE may determine to send the LOS indicator when a channel environment changes (e.g., changes in UE mobility, changes in the number of paths observed in the channel).

LOS Indicator for DL-TDOA

In the DL-TDOA, the UE may return to the network a Received Signal Time Difference (RSTD), i.e. a difference in time of arrival between the reference PRS and the target PRS. If the UE receives an indication to send the LOS indicator to the network, the UE may send LOS indicators for both the reference PRS and the target PRS or the LOS indicator only for the reference PRS.

If the LOS indicator for the reference PRS is below the configured threshold, the UE may determine to request the network to change the reference PRS. Once the reference PRS is changed by the network, the UE may return RSTD once the LOS indicator for the new reference PRS is above the threshold. Otherwise, the UE may keep requesting to change the reference PRS to the network until the LOS indicator is above the threshold.

In another example, the UE may determine to return the LOS indicator for PRS resource or PRS resource set with wide beamwidth. For example, if the UE is configured with two PRS resource sets, one resource set containing PRS resources with wide beamwidth and another PRS resource set containing PRS resources with narrower beamwidth compared to the former set of PRS resources, the UE may determine to return LOS indicators for PRS resources with wider beamwidth, i.e., PRS resources in the former PRS resource set. The UE may receive additional assistance information indicating beamwidth for PRS resources and the UE may determine beamwidth for each PRS resource/resource set based on the assistance information. In another example, the UE may receive a LOS indicator for a configuration parameter at a higher level in the PRS configuration hierarchy and UE may determine to report LOS indicators for all PRS parameters that belongs to the parameter. For example, the UE may receive a LOS indicator for a PRS resource set from the network, and the UE may determine LOS indicators for all PRS resources in the PRS resource set and report them to the network. Similarly, the UE may receive a LOS indicator for a TRP from the network and the UE may determine to return LOS indicators for PRS resources associated with the TRP. The UE may receive an explicit reporting configuration from the network to determine and report LOS indicators for the PRS parameters under the parameter with the LOS indicator.

LOS Indicator for AoD Positioning

In AoD positioning, if the UE uses the same Rx beam to receive one or more PRS resources in a PRS resource set, the UE includes the corresponding Rx beam index in the measurement report. The UE determines to include the Rx beam index to notify the network that the same Rx beam was used to receive multiple PRS beams. Thus, the UE may determine the LOS indicator(s) and associate the LOS indicator(s) with PRS resource(s) and report the association to the network if the same Rx beam was used to receive the PRS resource(s). The UE may determine to use the same Rx beam/index to receive PRS resources from the same PRS resource set or different PRS resource sets. For example, if the UE receives a request from the network to report LOS indicator(s), the UE determines the LOS indicators for multiple PRS resources and reports them to the network only if the same Rx beam is used to receive the PRS resources from the same PRS resource set. If different Rx beams are used to receive the PRS resources (e.g., Rx beam index #1, #2, and #3 are used to receive PRS resource #1, #3 and #5, respectively), the UE may determine not to include the LOS indicators for the PRS resources in the measurement report.

In another example, if the Rx beam index #1 is used to receive PRS resources #1, #2 and #3, and Rx beam index #2 is used to receive PRS resources #4, #5 and #6, the UE may include 6 LOS indicators, each of them corresponding to PRS resource #1 through #6. The UE may associate Rx beam index, PRS resource index and LOS indicator such that ambiguities in association is avoided. For example the UE may associate an LOS indicator with Rx beam index #1 and PRS resource #2, in the aforementioned example. Alternatively, the UE may associate the LOS indicator(s) for the Rx beam index/indices without associating the LOS indicator(s) to PRS resource(s), if the Rx beam index/indices are included in the measurement report. For example, the UE may include a LOS indicator for Rx beam index #1 and another LOS indicator for Rx beam index #2, in the aforementioned example. The UE may be configured by the network to report association of LOS indicator(s) to RX beam index/indices or to report association of LOS indicator(s) to Rx beam index/indices and PRS resource ID(s).

In another example, the UE may determine to associate LOS indicator(s) with a TRP if the same Rx beam is used to receive PRS(s) on configured PRS resource(s) from the TRP. Thus the UE may determine to associate LOS indicator(s) per PRS resource/measurement per Rx beam per TRP. Alternatively, the UE may determine to associate LOS indicator(s) per TRP per Rx beam.

LOS Indication for UE-Based Positioning

In UE-based positioning, the UE determines its location based on measurements obtained from PRS and report location information to the network. For UE-based positioning, the UE may request the network to send the LOS indicator(s) associated with PRS resource(s)/PRS resource set(s)/TRP(s)/cell(s)/frequency layer(s). For example, the UE may receive LOS indicators associated with multiple PRS resources configured by the LMF (e.g., a LOS indicator associated uniquely for each PRS resource). The UE may receive LOS indicators during the initial configurations of PRS, i.e., the UE may receive the LOS indicators from the network without sending a request to the network. The UE may determine LOS indicators for a certain set of PRS resource(s) based on the LOS indicator associated with a PRS resource set or TRP. For example, the UE may determine that if there are N PRS resources associated with a PRS resource set, and an LOS indicator is associated with the PRS resource set, the UE may determine that the same LOS indicator can be applied to the N PRS resources associated with the PRS resource set. The UE may receive a LOS indicator for a specific PRS resource or TRP (e.g., reference PRS or TRP used to determine RSTD for the DL-TDOA positioning method). Alternatively, the condition under which the UE sends the request may be based on receiving an indication from the network via LPP or RRC/MAC-CE/DCI that the LOS indicator can be sent to the UE. This indicates that the network has collected enough measurements to determine the LOS/NLOS likelihood. The UE may send a request after the UE sends its location information to the network.

The UE may request the network to send the LOS indicator associated with at least one of the following parameters. The UE may receive LOS indicators for the parameters following in the initial PRS configuration, i.e., the UE may receive the LOS indicators associated with the following parameters without a request from the UE:

- TRP (e.g., the LMF may indicate a LOS indicator(s) for TRP ID(s) the UE requested) or PRS ID,
- PRS resource (e.g., the LMF may indicate a LOS indicator(s) for PRS resource ID(s) the UE requested), PRS resource set (e.g., the LMF may indicate a LOS indicator(s) for PRS resource set ID(s) the UE requested), cell (e.g., the LMF may indicate a LOS indicator(s) for cell ID(s) the UE requested), and boresight angle (e.g., the UE may receive a LOS indicator for the boresight angle the network indicates, e.g., for 60 degrees, LOS indicator=0.75, 30 degrees, LOS indicator=1).

The network may indicate granularities of the LOS indicator to the UE via LPP or RRC message. The granularity of the LOS indicator may depend on the capability of the network or channel condition (e.g., Doppler shift/spread, delay spread, the number of multiple paths in the channel).

In another example, the UE may determine to receive LOS indicator(s) per TRP or PRS resource based on configured granularity of the LOS indicator(s). For example, if the UE is configured by the network to receive 0 or 1 as an indicator, the UE may determine to receive LOS indicators associated per TRP from the network (e.g., LMF, gNB). Alternatively, if the UE is configured to receive LOS indicators with values in the range 0 to 1 with a granularity of 0.1, the UE may determine to receive a LOS indicator per PRS resource from the network. The UE may receive LOS indicators associated with PRS IDs which may be IDs used for TRPs. In another example, the UE may be configured, by the network (e.g., LMF, gNB), to receive both a set of LOS indicators associated with PSR resources and another set of LOS indicators associated with TRPs from the network. The granularity of LOS indicators may be different depending on what the indicators are associated with. For example, LOS indicators associated with TRPs may be either 0 or 1 and LOS indicators associated with PRS resources may have granularities of 0.1.

LOS Indicator for DL & UL Method

For DL & UL positioning methods, the UE receives the PRS, transmits SRS for positioning (SRSp) and reports to the network time difference between reception of PRS and transmission of SRSp. The UE may return the LOS indicator for the received PRS. In addition, the UE may receive the LOS indicator from the network (e.g., LMF, gNB) for the SRSp the UE transmitted. In another example, the UE may receive LOS indicator(s) for PRS resource(s) after the UE transmits SRS for positioning.

Figure 9:
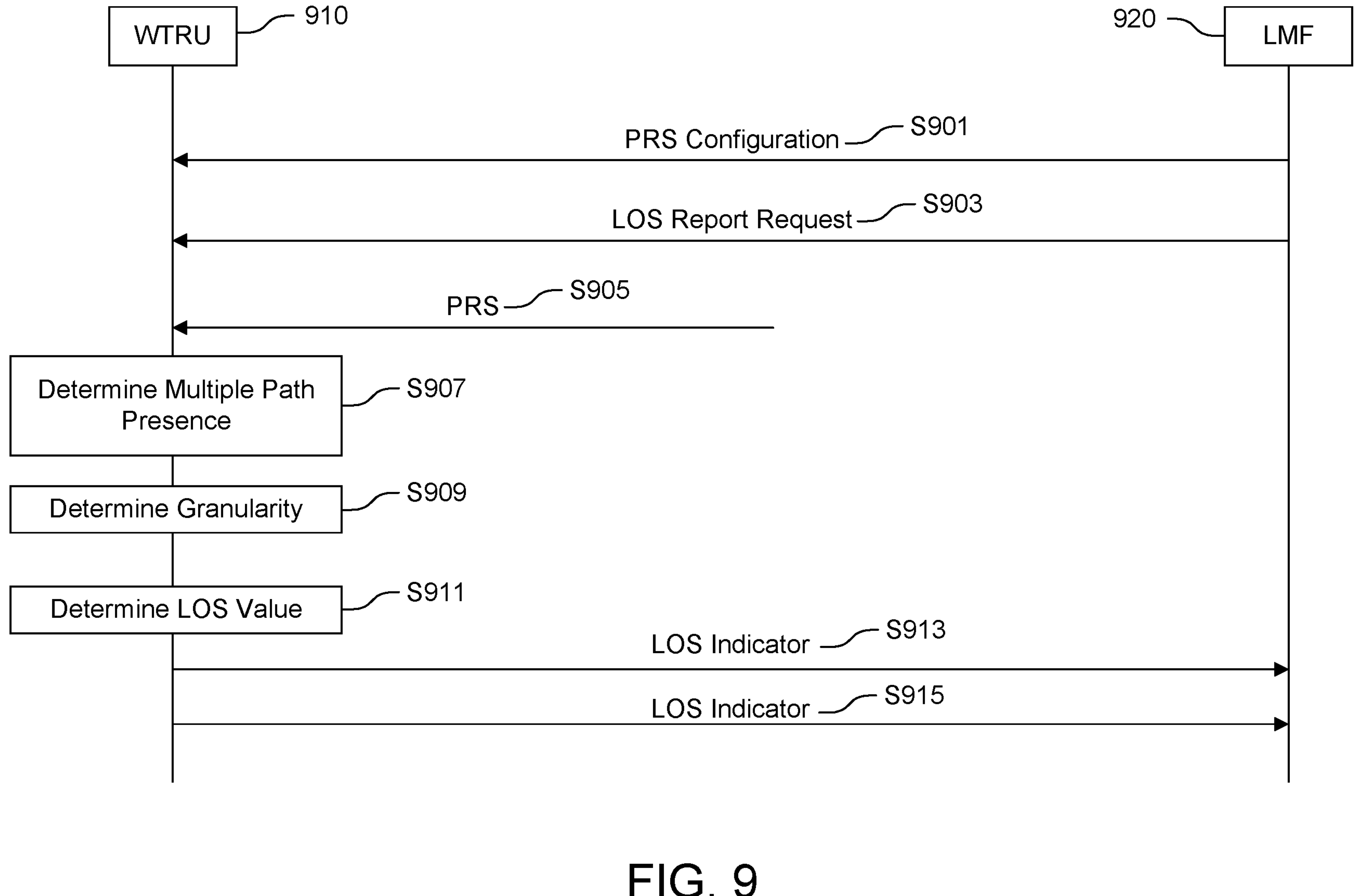
FIG. 9 is a flow chart illustrating a method of positioning including a Line of Sight indicator according to an embodiment.

FIG. 9 is a flow chart illustrating a method of positioning including a LOS indicator according to an embodiment.

In step S901, a UE 910 receives PRS configuration information from a LMF 920.

In step S903, the UE 910 receives a request to report the LOS indicator. The request can further include a threshold to determine granularity of the LOS indicator, candidate values for the LOS indicator, reporting interval and duration.

In step S905, the UE 910 receives PRS from one or more devices (not shown).

In step S907, the UE 910 may determine the presence of multiple paths in the channel based on multiple times of the arrival for the PRS, where the number of multiple paths is M.

In step S909, the UE 910 determines a granularity (e.g., the number of candidate values for the LOS indicator) of the LOS indicator based on M and a threshold configured by the LMF 920.

In step S911, the UE 910 determines the value of the LOS indicator based on time of arrivals of the PRS and/or RSRP of the received PRS.

In step S913, the UE 910 reports to the LMF 920 the LOS indicator for the PRS where the value for the indicator is selected from the determined candidate values.

In step S915, the UE can continue to report the LOS indicator, e.g. at configured intervals until the end of a reporting duration.

Reciprocity Based DL & UL Method

For satellite communication, uplink transmission may take significant amount of time due to long propagation delay. Thus, to reduce latency for positioning, it may be desirable for the UE to determine the order of transmission of uplink reference signals for positioning (e.g., SRS for positioning) based on LOS indicator for downlink reference signals.

For example, for multi-RTT, the UE may receive configuration information for one or more PRS resources. The UE may make measurements on configured PRS resources and determine a LOS indicator for each PRS resource based on measurements made on the PRS resources. Alternatively, the UE may receive a LOS indicator for each PRS resource from the network (e.g., LMF, gNB) and use them to determine the order of transmission for SRSp.

In addition, the UE may receive a spatial relationship between the PRS resources and uplink reference signals for positioning (e.g., SRS for positioning). If a PRS resource and a SRSp resource are spatially related, the UE may, to transmit the SRSp, use a Tx beam that is facing the similar direction as the Rx beam which is used to receive PRS on the PRS resource.

The UE may send multiple SRSp at configured SRSp resources to the network such that the network can determine the gNB Rx−Tx time. In a scenario such as satellite communication, the UE may need to prioritize transmission of SRSp such that the SRSp that is most likely aligned along the LOS path is transmitted first. Thus, based on the LOS indicators associated with PRS resources, the UE may determine the order of transmission of SRSp.

In an example, the UE is configured with PRS1, PRS2, and PRS3, and with SRSp1, SRSp2 and SRSp3. The UE also receives spatial relationship from the network (e.g., LMF, gNB), relating PRS1 and SRSp2, and PRS3 and SRSp3. The UE receives PRS1, PRS2 and PRS3 and based on measurements (e.g., RSRP, RSTD, ToA), the UE determines that the LOS indicators associated with PRSs are 0.8, 0.6 and 0.3, respectively.

The UE may determine that PRS1 will be used as the reference PRS to compute UE Rx−Tx time since the UE receives PRS1 at the earliest time, compared to PRS 2 or PRS3.

Since SRSp2 is related spatially with PRS1 which has the highest associated LOS value, the UE determines to transmit SRSp2 first. The UE also reports to the network the corresponding UE Rx−Tx time (e.g., the difference between reception time of PRS1 and transmission time of SRSp2).

Since SRSp3 is related spatially with PRS3, the UE determines to transmit SRSp3 after the UE transmits SRSp2. The UE also reports to the network corresponding UE Rx−Tx time (e.g., the difference between reception time of PRS1 and transmission time of SRSp3).

Since SRSp1 is not related spatially with any PRSs, the UE determines to transmit SRSp1 after the UE transmits SRSp3. The UE also reports to the network corresponding UE Rx−Tx time (e.g., the difference between reception time of PRS1 and transmission time of SRSp1).

An exemplary embodiment is described below:

1. The UE receives PRS configuration information and corresponding LOS indicators from the LMF. The UE receives SRSp configuration information from the serving gNB and spatial relationships between SRSp and downlink reference signals (e.g., PRS).

2. The UE receives PRS and determines the reference PRS based on time of arrival (e.g., the reference PRS is the PRS with the earliest time of arrival).
3. The UE selects SRSp(s) which are spatially related to the configured PRS to determine order of SRSp transmission.
4. Among the selected SRSp(s), the UE determines the order of SRSp transmission based on LOS indicator value of related PRS. For example, the UE transmits the SRSp which is related spatially with PRS with the highest LOS value first.
5. Among SRSp(s) that are not selected, the UE determines to transmit SRSp based on other criteria (e.g., from the lowest SRSp resource index to the highest SRSp resource index). The UE transmits the SRSp after the aforementioned selected SRSps are transmitted at configured SRSP resources.
6. The UE transmits SRSp(s) according to the order. The UE also reports corresponding UE Rx-Tx difference (e.g., difference between Rx time of the reference PRS and transmission time of SRSp).

In another example, the UE may determine SRSp transmission based on LOS indicator associated with TRP. For example, the UE may receive spatial relationship(s) between configured SRSp resource(s) and PRS resource(s). The PRS(s) associated with the PRS resource(s) may be transmitted from different TRPs. The UE may determine LOS indicators for TRP(s) based on measurements made on the configured PRS resource(s) or the UE may obtain LOS indicator(s) for each TRP from the network.

Based on LOS indicators, the UE may determine the order of transmission of SRSp, e.g., SRSp transmitted to a TRP with the highest LOS indicator among configured TRPs is transmitted first.

An exemplary embodiment is described below:

1. The UE receives PRS configuration information and LOS indicators associated with TRPs from the LMF.
2. The UE receives SRSp configuration information from the serving gNB.
3. The UE determines the order of SRSp transmission based on LOS indicators associated with TRPs, e.g., the SRSp transmitted toward the TRP with the highest LOS indicator is transmitted first. The UE reports to the network corresponding UE Rx-Tx difference (e.g., difference between Rx time of PRS from the TRP and transmission time of SRSp).

Multi-Iterative NLOS Mitigation for Positioning

The LOS probability between each UE TRP link and the geographical position of the TRP sending PRS to the UE can have a significant impact on the achieved positioning accuracy.

In the downlink-based positioning method, the UE measures multiple PRSs from multiple TRPs and the time difference of arrival between a pair of PRSs. When the UE is in LOS condition with both TRPs, the measurement error (due to multipath) tends to zero. However, when one (or both) of the TRPs sending PRS is in NLOS condition, a positive bias will be observed in the propagation time between the UE and the TRP(s). This added positive bias propagates to RSTD measurements, which negatively impacts the achievable positioning accuracy by the corresponding positioning technique.

In the uplink-based positioning technique, the UE sends SRS or SRS for positioning to the TRPs. The TRPs observe RTOA and reports them to the LMF for position calculation. In case of a NLOS situation between a UE and a TRP, the signal received at the TRP travels multipath. Multipath propagation of a signal results an additional bias in RTOA measurements, which negatively impacts the positioning accuracy.

In the uplink and downlink positioning technique, UE measures RX-TX time difference between received PRS and SRS transmitted. When the UE is in NLOS situation with the TRPs there may still be a bias in the measurement since multipath offset added for SRS and PRS transmission may be different due to different antenna configurations at the UE and TRP.

To enhance positioning performance, a LOS indicator between a UE and TRP has been specified in Rel. 17. The LOS indicator can be a soft (e.g. [0.0, 0.25, 0.5, 0.75, 1.0]) or a hard (e.g. [0,1]) value. For the sake of simplicity, a hard indicator will be used as an example in the following description.

With the availability of the LOS indicator, a solution to enhance the positioning accuracy is to use only LOS TRPs for positioning related measurements.

Due to multipath propagation and NLOS condition between UE and TRP, error is introduced in positioning related measurements. Selection of TRPs to send PRS to the UE can have a significant impact on the accuracy achieved. Choosing TRPs with highest (or lowest) measurement value may introduce inaccuracy in the achieved positioning.

Timing difference-based positioning techniques formulate multi-variable multi-step equations. The solution of these equations can result in a set of probable solutions. Identification of the unique solution out of the set of probable solution tends to be challenging.

In an embodiment, the unique solution can be obtained by i) estimating a coarse position of the UE, ii) select TRPs to send PRS to the UEs, and iii) identify the unique solution from the solution set.

i) Estimating a "coarse position" of the UE: in an embodiment, the UE may apply DL or UL or DL & UL based positioning technique to estimate a position to be considered the coarse position. Output of the coarse positioning may for example be absolute Cartesian coordinates, relative Cartesian coordinates, polar coordinates, absolute Cartesian coordinates with a margin of error (e.g., radius and height), and polygon boundaries in 3D space e.g. based on the three nearest TRPs which may include TRPs in LOS and/or NLOS conditions.

ii) Selection of TRPs to send PRS to the UEs: In an embodiment, the UE may select TRPs to use from a visible set of TRPs by criteria configured by the network (e.g., LOS indicator, measurement of positioning reference signals and geographical location of the reference TRPs).

iii) Identification of the unique solution from the solution set: In an embodiment, the UE applies a positioning-based technique with the measurements made with selected (or LOS) TRPs and generates a set of possible solutions. Based on the "coarse position" obtained in i), the UE selects a solution out of the solution set and sends it to the network/LMF. The UE can select a solution that matches the "coarse position," for example a solution that lies within bounds of the coarse position.

Figure 10:
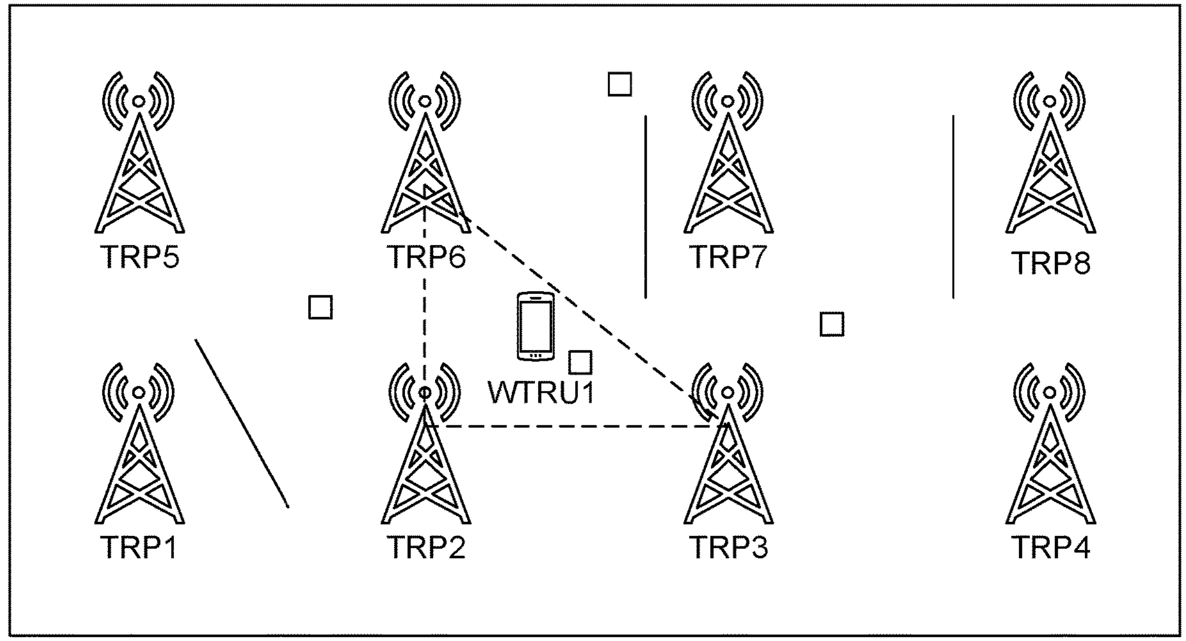
FIG. 10 illustrates an example scenario in which only Line of Sight TRPs are used for positioning.

FIG. 10 illustrates an example scenario illustrating this embodiment. In the example deployment scenario, in an indoor factory hall (indicated by a surrounding rectangle), there are 8 TRPs/MBs deployed marked as TRPX (X=TRP id). One UE, UE1, is placed in the deployment area. In the example scenario, for UE1, TRPs with LOS condition are TRP2-TRP6, while the TRPs in NLOS situation with the UE1 are TRP1, TRP7 and TRP8. The NLOS situations may be created by physical objects or obstacles, illustrated by solid lines, between UE1 and TRPs (e.g., TRP1, TRP7 and TRP8). The obstacles may block the LOS path or create reflected signals, which may create multipath channels between UE1 and TRPs. To achieve enhanced performance, TRPs in LOS conditions (e.g. [TRP2-TRP6]) are used in positioning methods and NLOS TRPs (e.g. [TRP1, TRP7, TRP8]) are not used for measurements in the methods; even though some of the NLOS TRPs might be closer to UE1 than LOS TRPs, for example TRP7 is closer to UE1 than TRP4.

In i), the network provides a coarse position (a triangle boundary marked with a dotted line) to UE1. It is noted that the boundary may also be defined with reference to at least one NLOS TRP.

In ii), the UE selects TRPs to send PRS and sends the selection to the network (e.g., gNB, LMF). In this example, the UE selects TRP2, TRP4 and TRP6 based on a condition (e.g., based on the LOS indication for the selected TRPs). It is noted that the selected TRPs are not necessarily the ones that are closest to the UE or the ones that are used to define the coarse position.

In iii), the UE applies a timing difference-based positioning technique and obtains four solutions marked by little squares. Based on the boundary (e.g., polygon) provided by the coarse position, the UE selects the solution that lies within. This solution can improve the performance for cases where possible solutions lie close to each other.

Trigger Conditions for UE to Send Request for Multi-Iterative NLOS Mitigation Positioning The UE may send a request to enable multi-iterative NLOS mitigation positioning to the network (e.g., gNB, LMF). The condition based on which the UE may send the request can be one or more of the following:

- uncertainty metrics such as variance or standard deviation of UE's location estimate, based on PRS transmitted from terrestrial TRPs, at or above (or below) a threshold value, for example configured by the network or QoS requirements;
- the number of LOS TRPs identified by the UE is at or below (or above) the threshold value configured by the network;
- based on LOS probability/LOS indicator provided by the network or determined by the UE, the UE decides to perform PRS measurements from TRPs further away than the geographically closest TRPs;
- to avoid synchronization error between specific TRP pairs, the UE determines to perform PRS measurements from the TRPs further away than the geographically closest TRPs; and
- to maximize distance (proximity) between the pair of solutions from solution set, the UE may determine to perform PRS measurements from the TRPs further away than the geographically closest TRPs.

Ways of Generating a Coarse Position

Based on the positioning reference signals transmitted by TRPs or gNBs, the UE may perform the measurement for coarse positioning, obtain the location estimate, and transmit it to the network (e.g., LMF, gNB). The UE may obtain the coarse position by one or more of the following ways.

The UE may obtain the UE's position be based on DL or UL or DL & UL positioning method.

The UE may apply an angle-based positioning technique.

Based on PRS measurements received from the UE, the network can identify N (e.g., N=3) geometrically closest TRPs to the UE. Based on the location of the N TRPs, the LMF forms a polygon with (x,y) coordinates of each TRP as vertices. Height range may be provided from historical positioning/height data.

The UE may predict its coarse position based on its past trajectory information (which may be received from LMF).

The UE may identify its coarse position based on the highest value of RSRP.

The UE may identify its coarse position based on beam sweeping (which requires involvement of a single TRP and UE).

The UE may identify its coarse position based on its past positioning information (e.g., specific position on a specific time of the week/day).

The UE may identify its coarse position based on GNSS measurements.

Conditions for the UE to Select TRPs to Send PRS

The UE may apply different criteria (e.g., configured by the LMF) to select among detected TRPs. The UE may use one or more of the following criteria.

The LOS probability or LOS indicator of a TRP is at or above (or below) a configured threshold value (e.g., by the LMF or the gNB).

The RSRP value of a TRP is at or above (or below) a configured threshold value.

The volume of the polyhedron formed by the subjected TRP and an existing list of LOS TRPs (e.g., provided by the network) is above (or below) the threshold value configured by LMF The RSRP or measurement value of PRS from specific set/subset of beam id (e.g., configured by the network) of the TRP is above (or below) a configured threshold value.

Figure 11A:
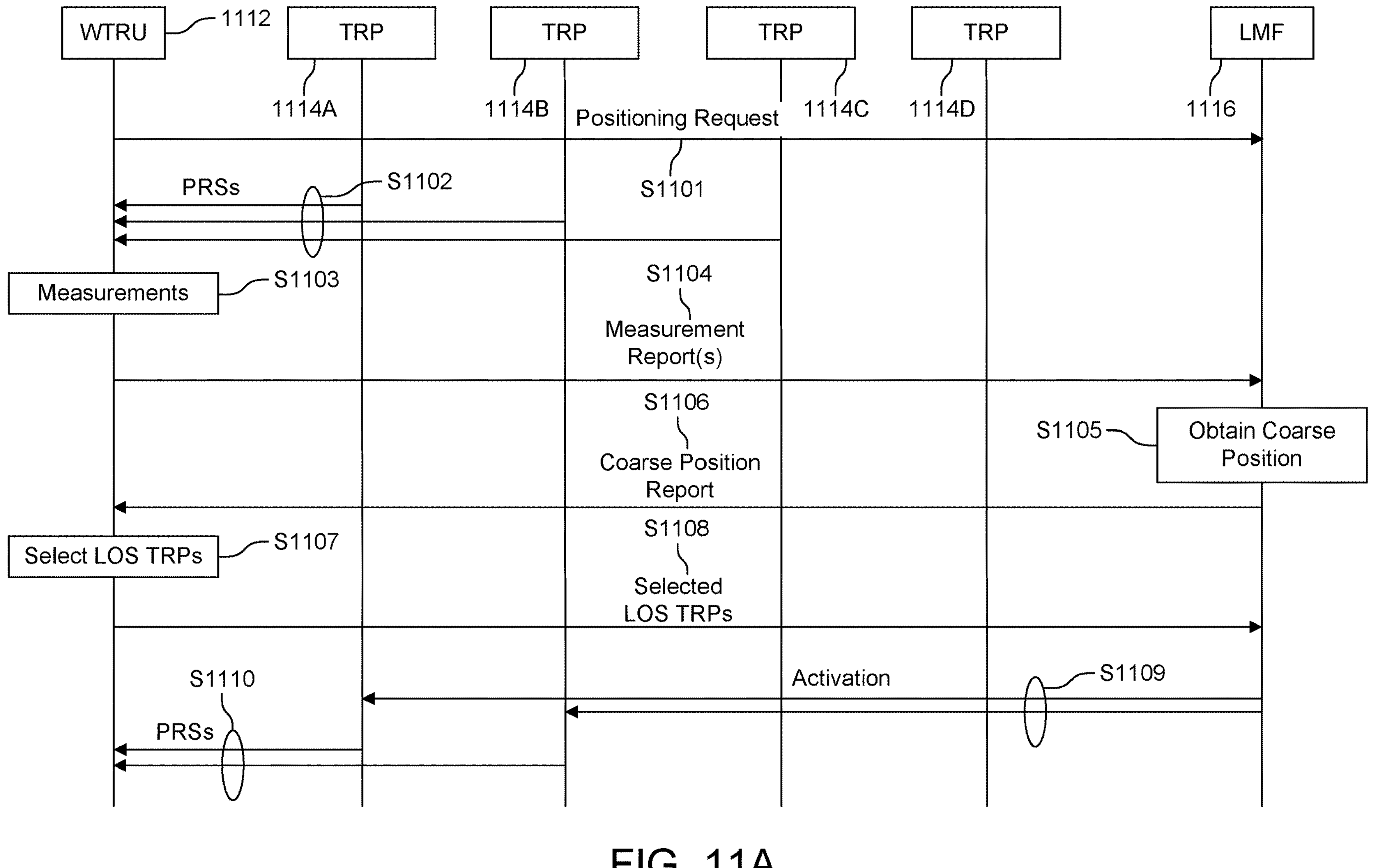
FIGS. 11A and 11B illustrate a sequence diagram for an example of UE-based multi-iterative NLOS mitigation positioning method according to an embodiment.
Figure 11B:
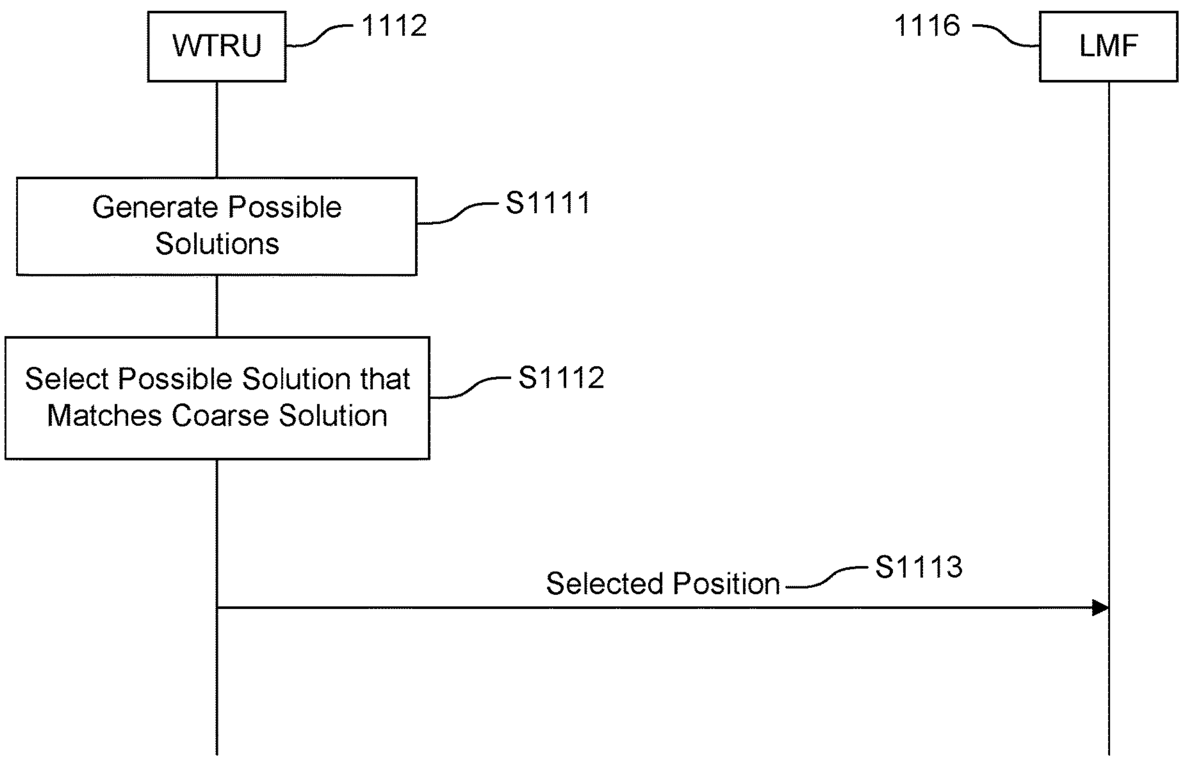

FIGS. 11A and 11B illustrate a sequence diagram for an example of UE-based multi-iterative NLOS mitigation positioning method according to an embodiment.

In step S1101, the UE 112 initiates enhanced NLOS mitigation positioning by transmitting a request to the network, e.g., LMF 116 (used as an example in the figure), to initiate enhanced NLOS mitigation positioning based on condition(s) configured by the network. The request from the UE to the network to initiate enhanced NLOS mitigation positioning may be an optional step. For example, the request may be included in the measurement report, such as in step S1104, hereafter.

In step S1102, the UE 1112 receives PRSs from multiple TRPs 1114A-1114D configured by network. In the example, only TRPs 1114A, 1114B, 1114C and 1114D send PRSs. The LMF may send an activation command to the gNB to activate TRPs 1114A, 1114B, 1114C and 1114D.

In step S1103, the UE 1112 makes measurements (e.g., RSTD, RSRP) on the received PRS from the TRPs.

In step S1104, the UE 1112 sends at least one measurement report to the LMF 1116.

In step S1105, the LMF 1116 obtains a coarse position for the UE by applying positioning without considering LOS probability of TRP.

In step S1106, the LMF 1116 sends a coarse position report to the UE 1112.

In step S1107, the UE 1112 selects TRPs based on LOS probability and identifies a list of LOS TRPs for PRS transmission.

In step S1108, the UE 1112 sends an indication about selected (LOS) TRPs to the LMF 1116 (e.g., sends LOS indicators associated with TRPs).

In step S1109, the LMF instructs/activates the identified (LOS) TRPs to transmit PRS. In the example, the LMF sends instructions to TRPs 1114A and 1114B send PRSs.

In step S1110, the UE receives PRS from (LOS) TRPs 1114A, 1114B.

In step S1111, the UE applies a positioning technique to generate a set of possible solutions.

In step S1112, the UE combines the coarse position (e.g., a bounding box) with the set of possible solutions and selects the solution that matches the coarse position. If there are more than one solution in the bounding box, the UE selects a solution based on one or more criteria (e.g., the selected solution is the closest to the centroid of the bounding box, the solution with the least amount of standard deviation is the selected solution, the selected solution is the closest to the average position of the solutions, the selected solution is the average of the solutions, the selected solution is the median of the solutions).

In step S1113, the UE transmits the selected position to the network.

Figure 12A:
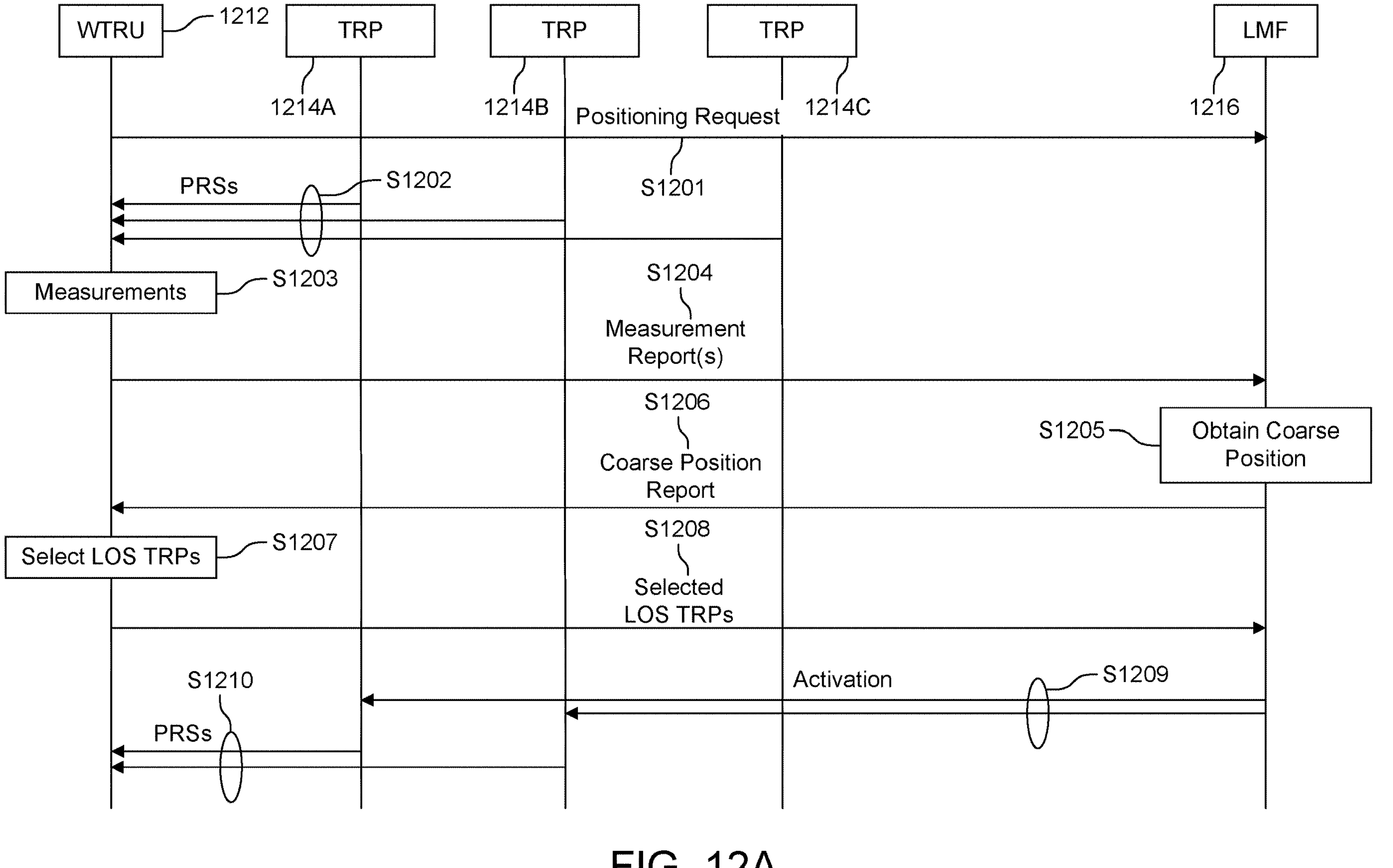
FIGS. 12A and 12B illustrate a sequence diagram for an example of UE-assisted multi-iterative NLOS mitigation positioning method according to an embodiment.
Figure 12B:
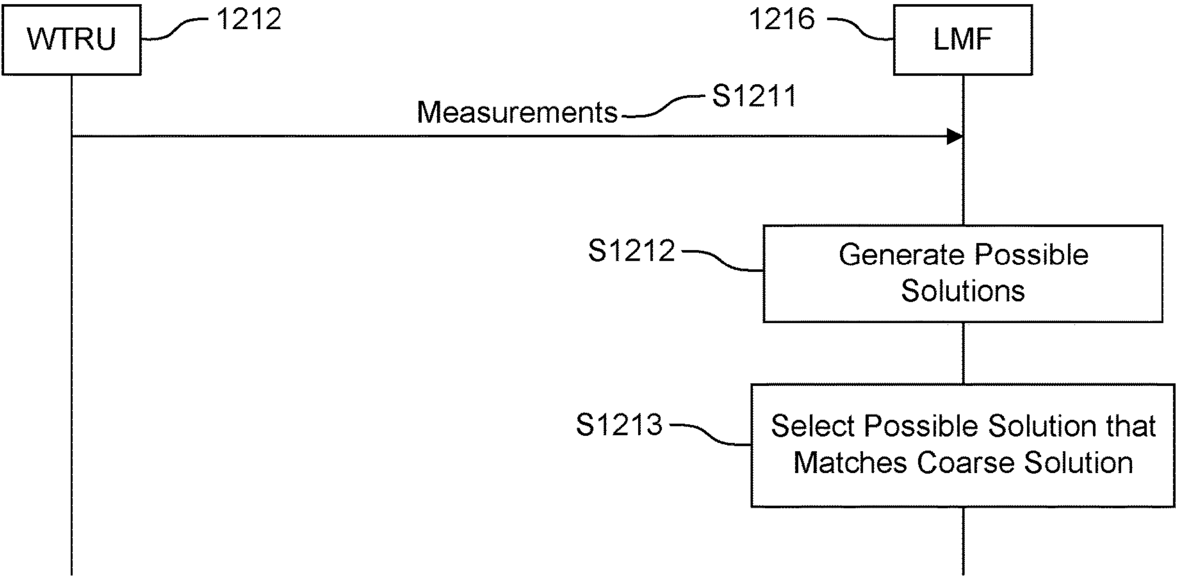

FIGS. 12A and 12B illustrate a sequence diagram for an example of UE-assisted multi-iterative NLOS mitigation positioning method according to an embodiment.

In step S1201, the UE 1212 transmits a request to the LMF 1216 to initiate NLOS mitigation positioning based on condition(s) configured by the LMF.

In step S1202, the UE receives PRS from multiple TRPs 1214A-1214C configured by LMF.

In step S1203, the UE makes measurements on the received PRS.

In step S1204, the UE sends at least one measurement report to the LMF.

In step S1205, the LMF applies positioning without considering LOS probability of TRP to generate a coarse position of the UE.

In step S1206, the LMF sends a message including the coarse position to the UE.

In step S1207, the UE selects LOS TRPs for PRS transmission based on criteria configured set by LMF from the set of visible LOS TRPs.

In step S1208, the UE reports selected LOS TRPs to the LMF.

In step S1209, the LMF instructs identified (LOS) TRPs, in the example TRP 1214A and 1214B, to transmit PRS to the UE.

In step S1210, the UE receives PRS from LOS TRPs, in the example TRP 1214A and 1214B.

In step S1211, the UE reports measurements received from LOS TRPs (in step S1210) to the LMF.

In step S1212, the LMF applies a positioning technique to generate a set of possible solutions.

In step S1213, the LMF combines the coarse measurement (e.g. a bounding box) with the set of possible solution and selects the solution that matches the coarse measurement (e.g., that falls within the bounding box).

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc."

is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth© module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method in a wireless transmit/receive unit (WTRU), comprising:

receiving a plurality of positioning reference signals from a plurality of terrestrial transmission points, the positioning reference signals including at least one positioning reference signal from a first terrestrial transmission point and at least one positioning reference signal from a second terrestrial transmission point;

on condition that at least one measurement value of the plurality of positioning reference signals satisfies a condition, transmitting a request to perform, at the WTRU, satellite-based positioning;

receiving, in response to the request, information regarding a set of satellites;

selecting, based on the information, at least one satellite from the set of satellites;

determining a second position estimate for the WTRU based on at least one positioning reference signal received from at least one selected satellite; and sending to a network node a message comprising information indicating the second position estimate for the WTRU.

2. The method of claim 1, further comprising measuring to obtain the at least one measurement value.

3. The method of claim 1, wherein the message further comprises information indicating at least one of the at least one selected satellite and second measurements related to the at least one selected satellite.

4. The method of claim 1, wherein the at least one measurement value satisfies the condition in case one measurement value related to one first measurement satisfies an individual condition.

5. The method of claim 1, wherein the at least one measurement value satisfies the condition in case every measurement value satisfies an individual condition, each measurement value related to a separate first measurement.

6. The method of claim 1, wherein the at least one measurement value expresses at least one of variance of an estimated position of the WTRU, standard deviation of an estimated position of the WTRU, and received signal power of the positioning reference signals.

7. The method of claim 1, wherein the request comprises a first position estimate for the WTRU.

8. The method of claim 1, wherein the information regarding the set of satellites comprises identifiers for the set of satellites.

9. The method of claim 1, wherein the information regarding the set of satellites comprises assistance information enabling the WTRU to select a subset of the set of satellites.

10. The method of claim 1, wherein the selecting is based on second measurements of at least one positioning reference signal received from at least one satellite of the set of satellites.

11. A wireless transmit/receive unit (WTRU), comprising:

memory storing processor-executable program instructions; and at least one processor configured to execute the program instructions to:

receive a plurality of positioning reference signals from a plurality of terrestrial transmission points, the positioning reference signals including at least one positioning reference signal from a first terrestrial transmission point and at least one positioning reference signal from a second terrestrial transmission point;

on condition that at least one measurement value of the plurality of positioning reference signals satisfies a condition, transmit a request to perform, at the WTRU, satellite-based positioning;

receive, in response to the request, information regarding a set of satellites;

select, based on the information, at least one satellite from the set of satellites;

determine a second position estimate for the WTRU based on at least one positioning reference signal received from at least one selected satellite; and send to a network node a message comprising information indicating the second position estimate for the WTRU.

12. The WTRU of claim 11, wherein the at least one processor is further configured to execute the program instructions to measure to obtain the at least one measurement value.

13. The WTRU of claim 11, wherein the message further comprises information indicating at least one of the at least one selected satellite and second measurements related to the at least one selected satellite.

14. The WTRU of claim 11, wherein the at least one measurement value satisfies the condition in case one measurement value related to one first measurement satisfies an individual condition.

15. The WTRU of claim 11, wherein the at least one measurement value satisfies the condition in case every measurement value satisfies an individual condition, each measurement value related to a separate first measurement.

16. The WTRU of claim 11, wherein the at least one measurement value expresses at least one of variance of an estimated position of the WTRU, standard deviation of an estimated position of the WTRU, and received signal power of the positioning reference signals.

17. The WTRU of claim 11, wherein the request comprises a first position estimate for the WTRU.

18. The WTRU of claim 11, wherein the information regarding the set of satellites comprises identifiers for the set of satellites.

19. The WTRU of claim 11, wherein the information regarding the set of satellites comprises assistance information enabling the WTRU to select a subset of the set of satellites.

20. The WTRU of claim 11, wherein the at least one processor configured to select based on second measurements of at least one positioning reference signal received from at least one satellite of the set of satellites.

* * * * *